US010456682B2

United States Patent
Stafford et al.

(10) Patent No.: US 10,456,682 B2
(45) Date of Patent: Oct. 29, 2019

(54) AUGMENTATION OF A GAMING CONTROLLER VIA PROJECTION SYSTEM OF AN AUTONOMOUS PERSONAL COMPANION

(71) Applicant: Sony Interactive Entertainment Inc., Tokyo (JP)

(72) Inventors: Jeffrey Roger Stafford, San Mateo, CA (US); Javier Fernandez-Rico, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 72 days.

(21) Appl. No.: 15/714,591

(22) Filed: Sep. 25, 2017

(65) Prior Publication Data

US 2019/0091572 A1 Mar. 28, 2019

(51) Int. Cl.
| | |
|---|---|
| *A63F 9/24* | (2006.01) |
| *A63F 13/52* | (2014.01) |
| *A63F 13/24* | (2014.01) |
| *A63F 13/211* | (2014.01) |
| *A63F 13/32* | (2014.01) |
| *A63F 13/335* | (2014.01) |
| *A63F 13/25* | (2014.01) |
| *A63F 13/213* | (2014.01) |
| *G06T 15/20* | (2011.01) |
| *G06T 19/00* | (2011.01) |

(52) U.S. Cl.
CPC ............ *A63F 13/52* (2014.09); *A63F 13/211* (2014.09); *A63F 13/213* (2014.09); *A63F 13/24* (2014.09); *A63F 13/25* (2014.09); *A63F 13/32* (2014.09); *A63F 13/335* (2014.09); *G06T 15/20* (2013.01); *G06T 19/006* (2013.01)

(58) Field of Classification Search
CPC .... A63F 13/24; A63F 13/213; A63F 13/2145; A63F 13/52; A63F 13/53
See application file for complete search history.

(56) References Cited

U.S. PATENT DOCUMENTS

| | | | | |
|---|---|---|---|---|
| 2007/0149281 A1* | 6/2007 | Gadda | ..................... | G07F 17/32 463/34 |
| 2010/0279757 A1* | 11/2010 | Glenn, II | ............ | G07F 17/3211 463/17 |
| 2011/0053688 A1* | 3/2011 | Crawford | ................. | A63D 5/04 463/31 |
| 2012/0214588 A1* | 8/2012 | You | ...................... | H04N 9/3173 463/31 |

(Continued)

*Primary Examiner* — Steve Rowland
(74) *Attorney, Agent, or Firm* — Penilla IP, APC

(57) ABSTRACT

An autonomous personal companion executing a method of projection including tracking within a reference system a current position and orientation of a gaming controller used for controlling game play of a gaming application played by a user, wherein the personal companion is configured to provide services to the user. The method includes receiving information related to the gaming application from a gaming console supporting the game play. The method includes generating content based on the information related to the gaming application. The method includes moving the autonomous personal companion to a location having a direct line of sight to the controller. The method includes projecting the content from the autonomous personal companion to a surface of the gaming controller.

20 Claims, 22 Drawing Sheets

(56) References Cited

U.S. PATENT DOCUMENTS

| | | | |
|---|---|---|---|
| 2013/0253703 A1* | 9/2013 | Smith | H04N 9/3185 700/258 |
| 2013/0342813 A1* | 12/2013 | Wang | G03B 21/60 353/7 |
| 2014/0039677 A1* | 2/2014 | Moore | B25J 9/1694 700/258 |
| 2014/0049558 A1* | 2/2014 | Krauss | G06F 3/011 345/633 |
| 2016/0008710 A1* | 1/2016 | Cheng | A63F 13/2145 463/34 |

* cited by examiner

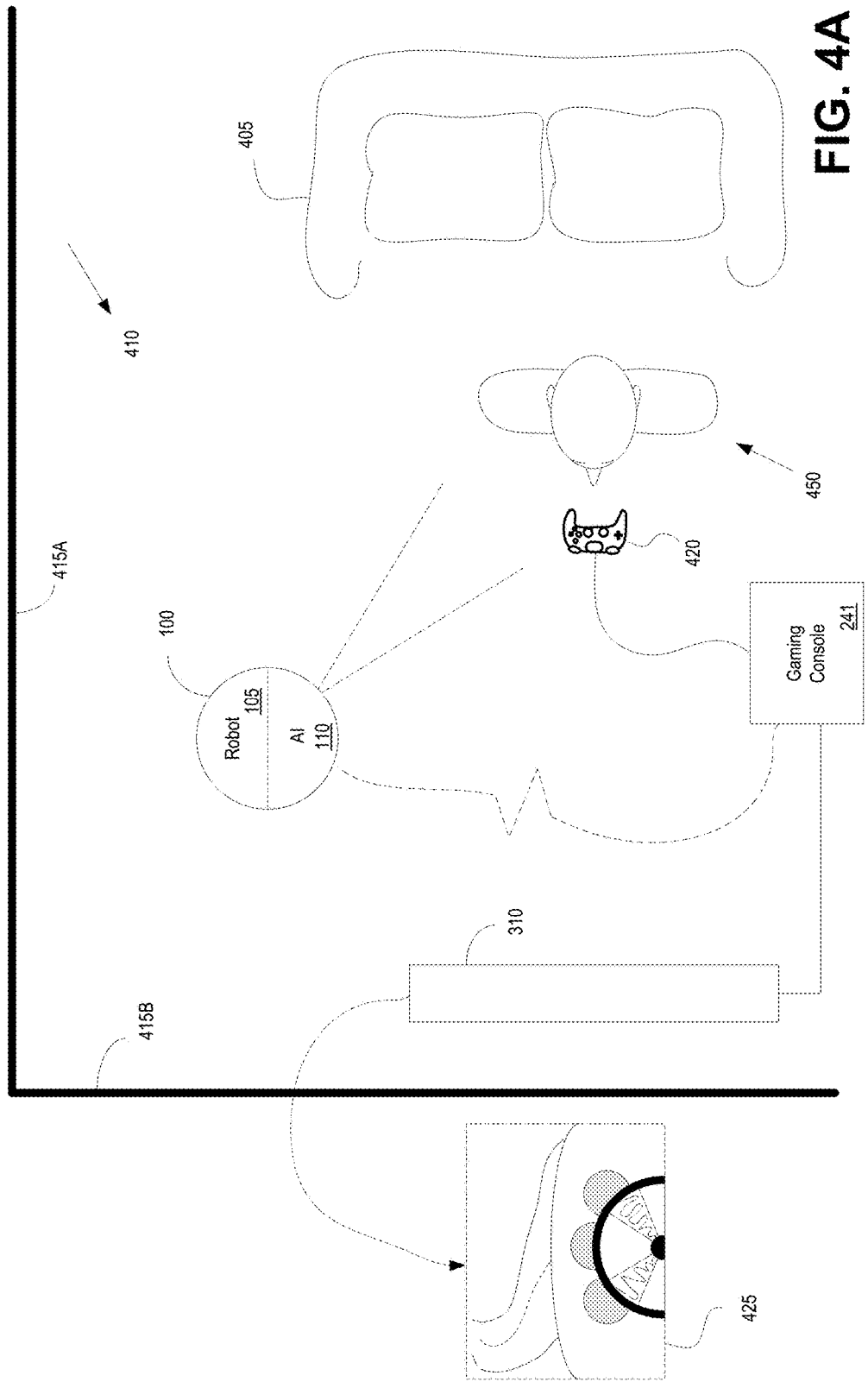

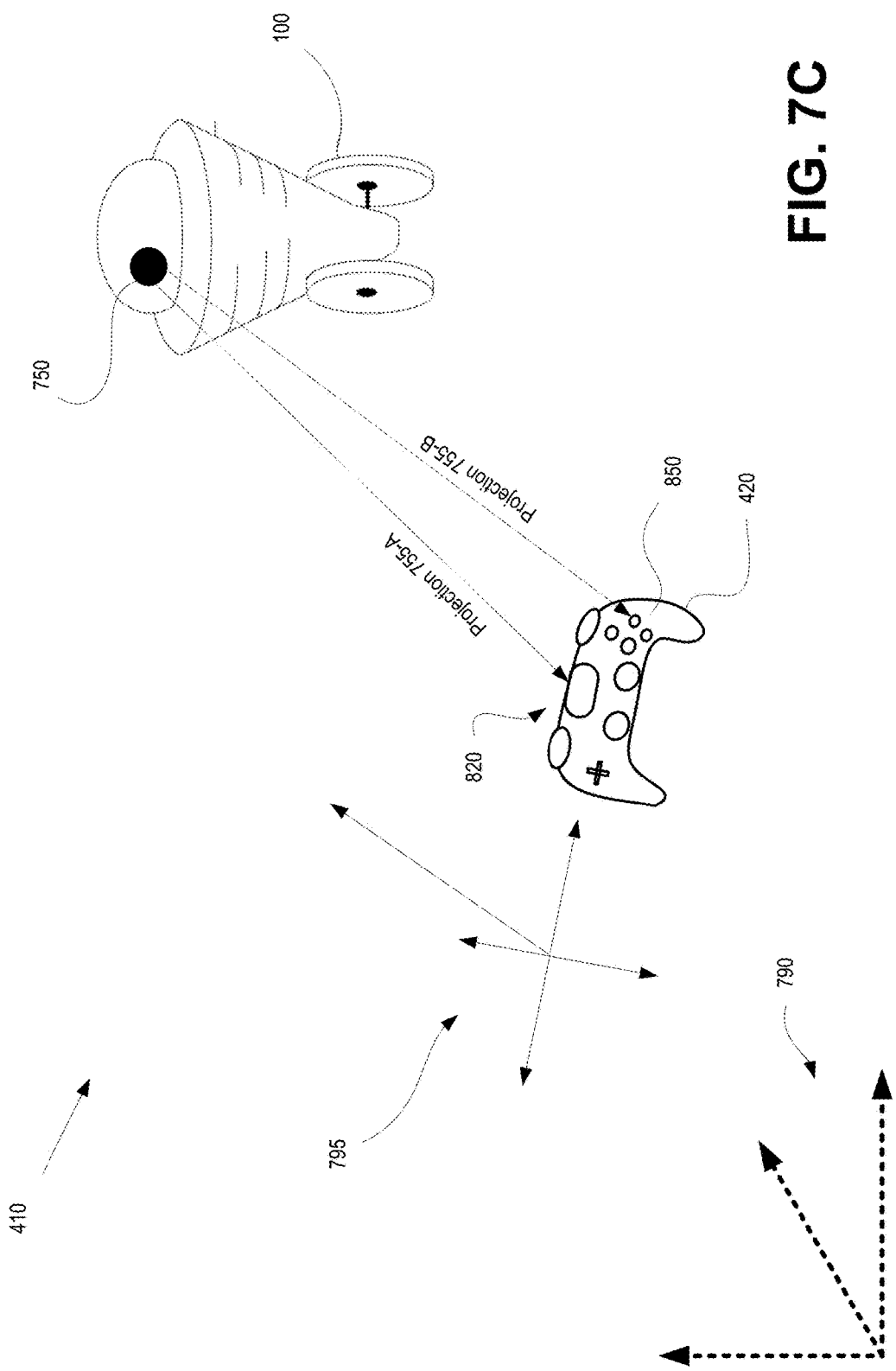

AUGMENTATION OF A GAMING CONTROLLER VIA PROJECTION SYSTEM OF AN AUTONOMOUS PERSONAL COMPANION

TECHNICAL FIELD

The present disclosure is related to intelligent robots, and more specifically to an automated companion personalized to a user that is implemented within an autonomous robot, and is also related to the building and implementation of the companion through artificial intelligence.

BACKGROUND OF THE DISCLOSURE

Robots are here. They are ready to interact with their human owners for a variety of reasons. These robots continue in a long line of robotic assistants, including robotic pets that were designed to provide companionship to their owners. Despite their limited processing power and restricted form factors, these early robotic pets could still move around somewhat autonomously, sense the immediate environment, have programmable intelligence for performing tasks, and interact (e.g., speak, bark, touch, etc.) with their human owners. These early robotic pets featured computer capabilities, vision sensor system, and articulators to facilitate one or more features, such as intelligence, object sensing, personality, and movement. For example, these robotic pets could interact with objects (e.g., ball), communicate with its owners, interact with its environment, play with its owners, travel about, etc. Also, these robotic pets could be programmed to participate in robot soccer leagues. Moreover, these robotic pets could grow and mature as the owners raised them through interaction. Also, these robotic pets could form personalities based on how they were raised.

These early robots are ready to reach the next level of capabilities to include, in part, increased intelligence, awareness, assistance, interaction, personality, and movement.

It is in this context that embodiments of the disclosure arise.

SUMMARY

Embodiments of the present disclosure relate to systems and methods for an autonomous personal companion implemented as an artificial intelligence (AI). In accordance with one embodiment of the present disclosure, the AI makes use of a model trained via a deep learning engine on information that has been identified as contextually relevant to a user with the goal of providing personalized assistance to the user. In one embodiment, the trained model acts a behavior selection strategy for the AI. The AI can be configured to be aware of and exchange data with other digital assets (e.g., phone contacts, calendar, phone, home automation, gaming console, etc.) operating under different proprietary operating systems. The AI can be integrated into a mobile platform and configured to move autonomously to position itself to best receive data, collect data, sense the environment, and deliver data. The AI can interact with a back-end server for processing, wherein the AI can process requests at a local level, or pre-process requests at a local level and then fully process those requests at the back-end server. In addition, other embodiments are related to the autonomous personal companion having a projection system and vision system that are enabled to recognize a physical game controller, and augment the controller by projecting information onto displayable surface areas of the controller, such as project/augment user button information (e.g., corresponding to a gaming application) directly onto the controller.

In one embodiment, an autonomous personal companion executing a method of projection is described. The method includes tracking within a reference system a current position and orientation of a gaming controller used for controlling game play of a gaming application played by a user. The tracking may be performed by the personal companion, wherein the personal companion is configured to provide services to the user. The method includes receiving information related to the gaming application from a gaming console supporting the game play. The method includes generating content based on the information related to the gaming application. The method includes moving the autonomous personal companion to a location having a direct line of sight to the controller. The method includes projecting the content from the autonomous personal companion to a surface of the gaming controller. For example, the content could be button information related to a gaming application.

In another embodiment, a non-transitory computer-readable medium storing a computer program for projection of content onto a physical gaming controller by an autonomous personal companion is disclosed. The computer-readable medium includes program instructions for tracking within a reference system by an autonomous personal companion a current position and orientation of a gaming controller used for controlling game play of a gaming application played by a user, wherein the personal companion is configured to provide services to the user. The computer-readable medium includes program instructions for receiving information related to the gaming application from a gaming console supporting the game play. The computer-readable medium includes program instructions for generating content based on the information related to the gaming application. The computer-readable medium includes program instructions for moving the autonomous personal companion to a location having a direct line of sight to the controller. The computer-readable medium includes program instructions for projecting the content from the autonomous personal companion to a surface of the gaming controller.

In still another embodiment, a computer system is disclosed, wherein the computer system includes a processor and memory coupled to the processor and having stored therein instructions that, if executed by the computer system, cause the computer system to execute a method for projecting content onto a gaming controller by an autonomous personal companion. The method as executed by the computer system includes tracking within a reference system a current position and orientation of a gaming controller used for controlling game play of a gaming application played by a user. The tracking may be performed by a personal companion configured with the computer system, wherein the personal companion is configured to provide services to the user. The method includes receiving information related to the gaming application from a gaming console supporting the game play. The method includes generating content based on the information related to the gaming application. The method includes moving the autonomous personal companion to a location having a direct line of sight to the controller. The method includes projecting the content from the autonomous personal companion to a surface of the gaming controller. For example, the content could be button information related to a gaming application Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 4A illustrates an autonomous personal companion supporting the game play of a user playing a gaming application, in accordance with one embodiment of the present disclosure.

FIG. 7C illustrates the augmentation of a gaming controller by the projection of content onto one or more displayable surfaces of the gaming controller by an autonomous personal companion providing services to a user, wherein the content may be related to a gaming application and/or a game play of the gaming application, in accordance with one embodiment of the present disclosure.

DETAILED DESCRIPTION

Figure 1A:
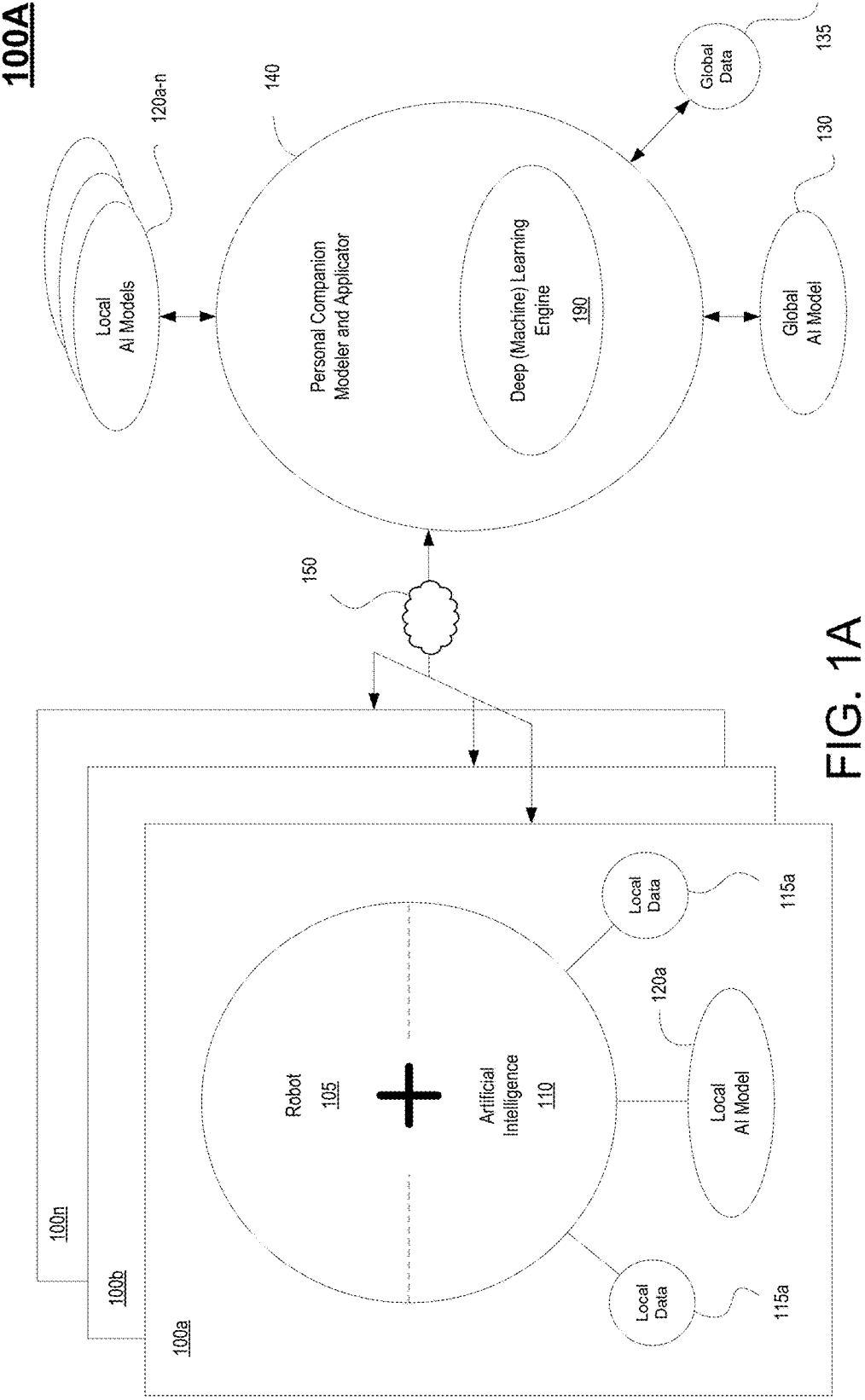
FIG. 1A is an illustration of an autonomous personal companion implemented through an artificial intelligence (AI) model of a user, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing deep learning (also referred to as machine learning) techniques to build an AI model personalized to a user. As such, the personal companion is implemented as an AI, wherein the AI makes use of a model trained via a deep learning engine on information that has been identified as contextually relevant to a user with the goal of providing personalized assistance to the user. The trained model can act as a behavior selection strategy for the AI. The AI model is implemented through an autonomous personal companion that is mobile. The AI can be configured to be aware of and exchange data with other digital assets operating under different proprietary platforms. The AI can be integrated within the mobile platform to move autonomously through an environment to best receive data, collect data, sense the environment, deliver data, to best sense and/or map the environment; as well as other features. In some implementations, the autonomous personal companion is configurable to interact with a back-end server for processing, wherein the AI can process requests at the local level, or pre-process requests at the local level, and then fully process those requests at the back-end server.

Furthermore, various embodiments of the present disclosure provide for the augmentation of a gaming controller by projecting content onto the controller by a projection and vision system of an autonomous personal companion, wherein the content may include controller button information that is projected onto a displayable surface adjacent to the controller button. The content may be related to a gaming application and/or game play of the gaming application by a user who is controlling the game play using the gaming controller. Advantages include augmentation of controller to be a source of information that is otherwise unavailable to the user when simultaneously engaging in the game play of a gaming application. For example, content related to the game play may be accessed by the user after suspension of the game play, and then navigating to a separate screen to obtain the content (e.g., controller functionality, game play hints, etc.). On the other hand, content related to the game play may be projected onto the gaming controller simultaneous to the user engaging with the game play, so that the game play is not paused. Other advantages include facilitating the modification of the functionality of the gaming controller by projecting a new function of a button and/or actuator onto a displayable surface of the controller that is adjacent to the button and/or actuator. Previously, the functionality of a gaming controller was fixed, in that the functionality of controls (e.g., buttons, actuators, etc.) could not be changed. On the other hand, from gaming application to gaming application, or within a single gaming application, the functionality of a control (e.g., buttons, actuators, etc.) may be modified to execute a different and new functionality than intended within a gaming application or between gaming applications. A user may be unaware of the new functionality; however, with embodiments of the present disclosure, content and/or information related to the new functionality could be projected onto the controller (e.g., adjacent to the control) so that the user can quickly reference the new functionality without having to go to a separate screen while pausing the game play.

With the above general understanding of the various embodiments, example details of the embodiments will now be described with reference to the various drawings.

FIG. 1A illustrates a system 100A used for building and implementing autonomous personal companions that are implemented through corresponding AI models of users, in accordance with embodiments of the present disclosure. In particular, an autonomous personal companion 100 is configured to interface with a corresponding user as a digital companion, for example to provide services to the user. In addition, the autonomous personal companion 100 may be supported by a back-end server (e.g., personal companion modeler and applicator 140) through a network 150 (e.g., internet), wherein the back-end server provides artificial intelligence and/or deep, machine learning (e.g., through the deep, machine, learning engine 190) for building and applying personalized AI models, each of which correspond to its respective user. For example, one or more companions 100a-100n are configured to support multiple users in one or more locations throughout the world.

Each autonomous personal companion 100 is configured to provide multiple capabilities that provide services for (e.g., support) its respective user. In general, the companion 100 may provide its services at the request of the user, or may autonomously provide services or offer services to the user at appropriate times (e.g., sensing a need by the user, or determining contextually relevant actions, random generation, etc.). For example, the autonomous personal companion 100 may be configured to provide digital assistance to the user, such as processing user search requests that perform various operations (e.g., search for information, purchase goods and/or services, etc.); autonomously generate search requests relevant to the user; autonomously generate actions that are contextually relevant to the user (e.g., purchasing potato chips through an electronic commerce vendor after noticing that the pantry is bare and a party was held the previous night); provide gaming assistance to the user playing a gaming application (e.g., providing tips and aids that are helpful in navigating through a corresponding gaming application); extend the displayed gaming space of a gaming application by integrating the three dimensional (3D) gaming space within the physical world, as well as other features.

In addition, the autonomous personal companion 100 may provide companionship to the user, such as hold a conversation with the user, provide digital assistance to the user, build a relationship with the user through conversations, and accompany the user throughout a period of time or multiple periods of time. The companion 100 may prompt the user to respond, much like a human or animal companion would. For example, the companion 100 may suggest beginning a game of cards to be played between the companion 100 and user, or may suggest watching digital content on a display (e.g., fixed display remote from or a display integrated with the companion 100), or may bring over a game controller to prompt the user to playing a gaming application.

At least some of the actions performed by the autonomous personal companion 100 are contextually relevant to the user. That is, because the companion 100 is contextually aware of the environment that the user is currently engaged in and is able to build and/or access an AI model that is personal to the user, the actions generated by the companion 100 can be tailored to a context within which the user is experiencing. For example, when the user makes a seemingly generic request (e.g., "What was the score last night?"), based on the AI model for the user and the current date, the companion 100 would determine the current context for that request and provide the appropriate and relevant response: "Warriors win 101-97." The response is contextually relevant, because the AI model defines the user as a fan of the Warriors, and wherein the user only keeps up with the Golden State Warrior games in the National Basketball Association. Further, the response is contextually relevant to the user because the AI model also defines the user as an NBA fan in the month of April during playoffs, and one who is not concerned with any scores from other sports. Because the current date is one in April, the score for the Warriors from the night before can be searched through the internet by the companion 100.

As shown in FIG. 1A, numerous personal companions 100a-100n are configured to interface with corresponding users as their respective digital companions. For purposes of brevity and clarity, companion 100a is described, and the description is representative of the features provided in companions 100a-100n. In particular, each companion is implemented within a robot 105 that is mobile, wherein the robot may take on any suitable form factor. Each companion is supported through artificial intelligence 110 that may be distributed both locally in the robot 105 and at the back-end server 140. In one embodiment, AI 110 is configured for deep learning that is used to build at least a portion of a local AI model 120a used for providing, in part, services to a corresponding user. This information that is learned using AI 110 may or may not be shared with the back-end server 140 that may also be tasked with building the local AI model 120a depending on the type of information that is collected and/or learned. For example, sensitive information may be processed locally to build the local AI model 120a, but may not be shared with the back-end server 140.

In addition, the AI 110 of companion 100a includes a version of the local AI model 120a, wherein model 120a is personal to the corresponding user, and wherein AI 110 is configured for implementing the AI model 120a. In particular, the term "local AI model" is used to indicate that the AI model corresponds to a particular or localized user. The local AI model 120a stored within the form factor of robot 105 may be a full version of the AI model, or may be a base model that autonomously provides some subset of the capabilities available with the full version of the AI model. The full version of the AI model is also stored and accessible by the back-end server 140 providing AI modeling and application. As such, companion 100a may function independent of the back-end server 140, and provide either a full set of capabilities (if the full version of the local AI model is stored at robot 105), or a limited set of capabilities (if a lesser version of the local AI models is stored at robot 105). On the other hand, companion 100a may function in cooperation with the back-end server 140, and provide the full set of capabilities provided by the local AI model 120a. For example, the local AI model 120a at the robot 105 works cooperatively (e.g., may pre-process data) with the local AI model 120a at the back-end server 140 which is better configured (faster and more resources) to perform most of the AI processing.

As shown in FIG. 1A, local data 115a is collected by companion 100a, such as by robot 105. The local data 115a may be used by the AI 110 at the robot 105 to help build the local AI model 120a, using whatever AI capabilities are stored at robot 105. In addition, the local data 115a may be delivered to the personal companion modeler and applicator at the back-end server 140 to build the local AI model 120a, using the AI capabilities of the deep, machine learning engine 190 (e.g., implementing a nearest neighbor based tagging and scenario selection algorithm). As shown, one or more local AI models 120a-n are generated and stored at the back-end server 140 for supporting one or more users.

Because the local data 115 for each of the companions 100a-100n is delivered to the personal companion modeler and applicator at the back-end server, each of the local data may be aggregated to generate a global AI model 130. The aggregated local data may be stored as global data 135.

Figure 1B:
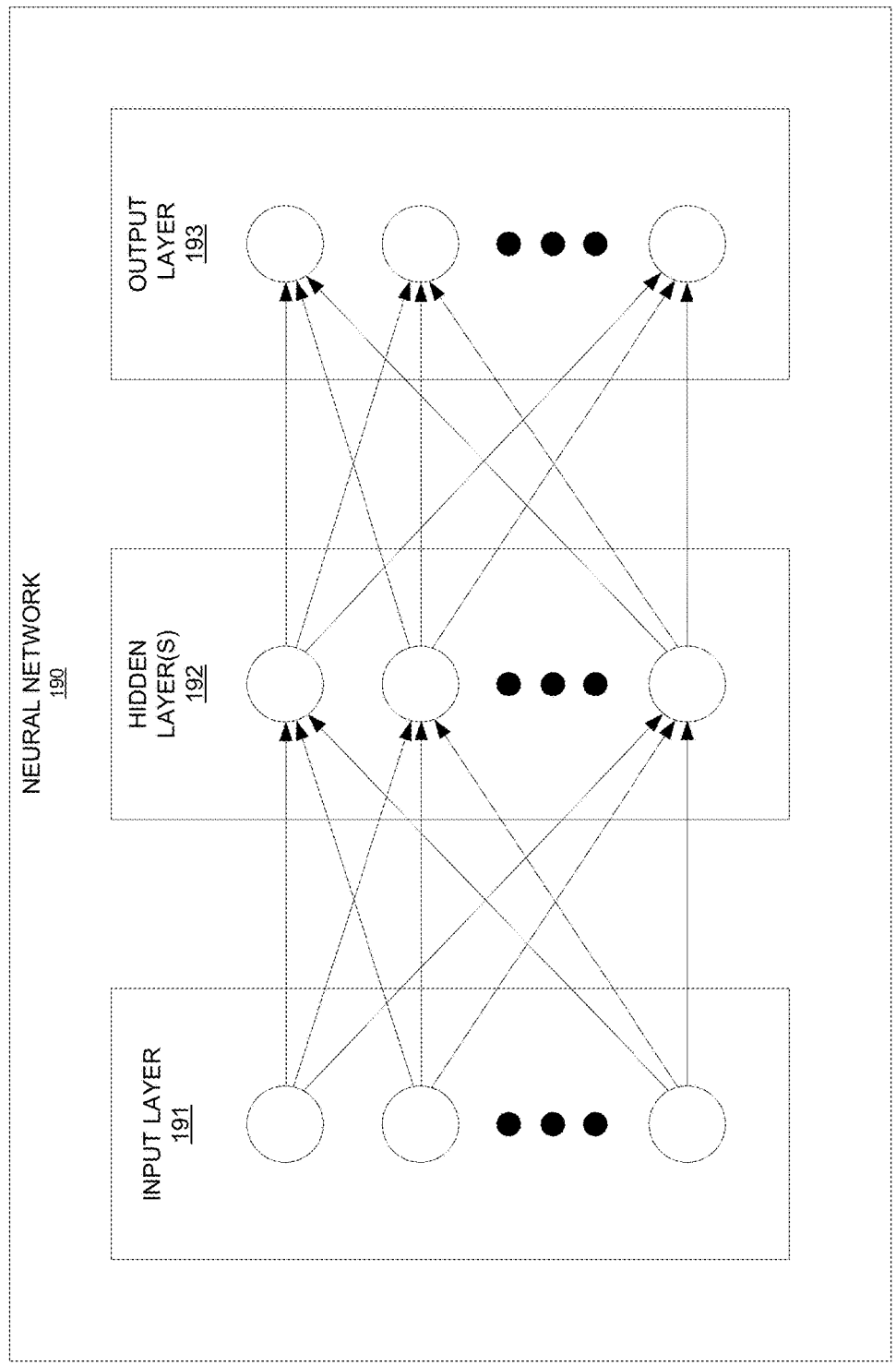
FIG. 1B illustrates an example neural network used to build an AI model of a user, wherein the AI model is used to implement an autonomous personal companion for a user, in accordance with one embodiment of the present disclosure.

FIG. 1B illustrates an example neural network used to build a local AI model for a corresponding user through training implemented by the deep learning engine 190 of the personal companion modeler and applicator 140, in accordance with one embodiment of the present disclosure. In one embodiment, deep learning engine 190 may be implemented to perform tag identification to classify user behavior. In particular, the modeler and applicator 140 in system 100A of FIG. 1A is configured to identify user behavior patterns and tag those patterns that may be useful and suitable for when the autonomous personal companion 100 provides services to the user. In addition, the neural network may be implemented within the AI 110 of companion 100, in one embodiment. The resulting local AI model 120 for the user defines, in part, the behaviors, biometrics, actions, emotions, expectations, desires, likes, wants, needs, and the environment (for providing context) of and relevant to the user. The personal companion modeler and applicator 140 may be any computing device, in particular, including a back-end server computing device that is coupled to each of the autonomous personal companions 101a-101n directly or through a network (e.g., local network, internet, etc.).

Specifically, the deep learning or machine learning engine 190 in the modeler 140 is configured to analyze local data 115 pertinent to the user, wherein the local data 115 is collected, in part, by the autonomous personal companion 100. The local data 115 is collected in association with monitoring the user (e.g., controller inputs, requests, actions, behaviors, responses, etc.), as well as the environment of the user. As will be described below, the companion 100 is configured with various features (e.g., camera, active actuators, passive sensors, controllers, mouse, scanners, etc.) that monitor and/or make request for purposes of collecting data. Basically, any relevant information associated with the user may be collected and used, in part, to define the user, and to understand the context within which the user is present, and to predict how the user feels, will act or respond to various conditions and/or stimuli. As such, the deep learning engine 190 is able to classify information about the user so that a corresponding local AI model 120 can provide the best services for the user, and wherein the services are provided with minimal input by the user. For example, the AI model 120 can be used (e.g., through implementation of the deep learning engine 190) to understand requests made by the user, to predict what the user will need or may want, and provide services that satisfy those requests and predictions.

In another embodiment, in addition to the local data 115, other data (e.g., global data 135) may be optionally utilized and/or collected by the plurality of personal companions 100a-n and also used in building the local AI model 120 for the corresponding user. Basically, the global data 135 is the aggregation of all the local data 115 collected for all the users. In particular, some data may be generic and suitable for use when building all AI models for all users, or at least some subset (of various sizes) of users. In addition, the global data 135 may be used to build a global AI model 130, that may be used generally for any user. Further, the global data 135 may be used to build various global AI models, each of which are targeted to a particular grouping of users (e.g., grouped through demographics, region, music tastes, schooling, etc.).

As such, the local data 115 and some portion of global data 135 are fed to the deep learning engine 190. The deep learning engine 190 utilizes artificial intelligence, including deep learning algorithms, reinforcement learning, or other artificial intelligence-based algorithms to build the local AI model 120 for the corresponding user.

In that manner, during the learning and/or modeling phase, the data is used by the deep learning engine 190 to predict the reactions, actions, wants, and/or needs for a given user given a set of input data. These reactions, actions, wants and/or needs may be generally classified as user behavior, and as such, the AI model 120 can be used to generally identify and/or classify behavior of a corresponding user given some input data, and provide an appropriate response for the AI (e.g., determine outward behavior of the AI as implemented through the personal companion). For example, the input data may be a specific request by the user, wherein the AI model 120 is used to generate a response, and wherein the response is related to services provided by the autonomous personal companion 100. In addition, the input data may be a collection of environmental data that irrespective of any directed user input or request may be used to predict the reactions, actions, wants and/or needs of the user to which the response is directed. For example, the AI model 120 may be used to predict what services the user may want and/or need without the user having to explicitly deliver a request.

Over time, the AI model 120 can identify and/or classify user behavior and apply the AI model to predict the behavior, actions, responses, wants and/or needs of a user in response to an approximate set of input data. For instance, tag identification and scenario selection may be used to identify and classify user behavior as tags, and provide an AI response that predicts the wants and/or needs of the user and provides services responsive to those wants and/or needs. For example, in the previously introduced example, a user is interested only in NBA scores in the month of April, and as such, any request for a sporting score of a game is used to predict the wants and needs of the user to include understanding that the user is a Golden State Warriors fan, and that in the month of April that user is only interested in scores from games played by the Warriors, all of which leads to a response (e.g., as implemented through the AI model 120) with the score for the latest game played by the Warriors. Other examples are useful in describing the building of the AI model 120. For example, the AI model 120 can be used to define certain biometrics of the user. In one case, the gait of the user can be defined, such that the personal companion can sense and track the footfall of an approaching person, and determine that it is the corresponding user associated with the AI model 120. The AI model 120 can be used to determine that at 5:00 pm, the user typically returns home, and sits down to watch digital content. As such, the personal companion 100 may upload content that is of interest to the user lately (e.g., binge watching a medical drama show) to a display already playing, or ready for play at the request of the user to the companion 100.

The neural network 190 represents an example of an automated analysis tool for analyzing data sets to determine the responses, actions, behavior, wants and/or needs of a corresponding user. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring and/or querying of the user and the environment associated with the user by the autonomous personal companion 100.

At the highest hierarchical level, an output layer 193 exists. The output layer 193 includes a set of output nodes. An output node represents a decision (e.g., prediction) that relates to one or more components of a local AI model 120, for example. As previously described, the output nodes may identify the predicted or expected responses, actions, behaviors, wants and/or needs of the user for a given set of inputs, wherein the input may define various scenarios (e.g., direct requests, time of day, various patterns of behavior, etc.). These results can be compared to predetermined and true results obtained from previous interactions and monitoring of the user and/or environment in order to refine and/or modify the parameters used by the deep learning engine 190 to iteratively determine the appropriate predicted or expected responses, actions, behaviors, wants and/or needs of the user for a given set of inputs. That is, the nodes in the neural network 190 learn the parameters of the AI model 120 that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x)$ =max(0,x).

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the predicted or expected responses, actions, behaviors, wants and/or needs of the user for a given set of inputs or input data. In this illustration, the data domain includes session data collected for interactions of the user with baseline input data. In another example, the training dataset is from different data domains to include input data other than baseline.

As such, the neural network 190 may identify expected responses, actions, behaviors, wants and/or needs of the user for a given set of inputs. Based on these predictive results, the neural network 190 may also define an AI model 120 that is used to provide contextually aware (e.g., of the environment and user) services for the corresponding user.

Figure 2:
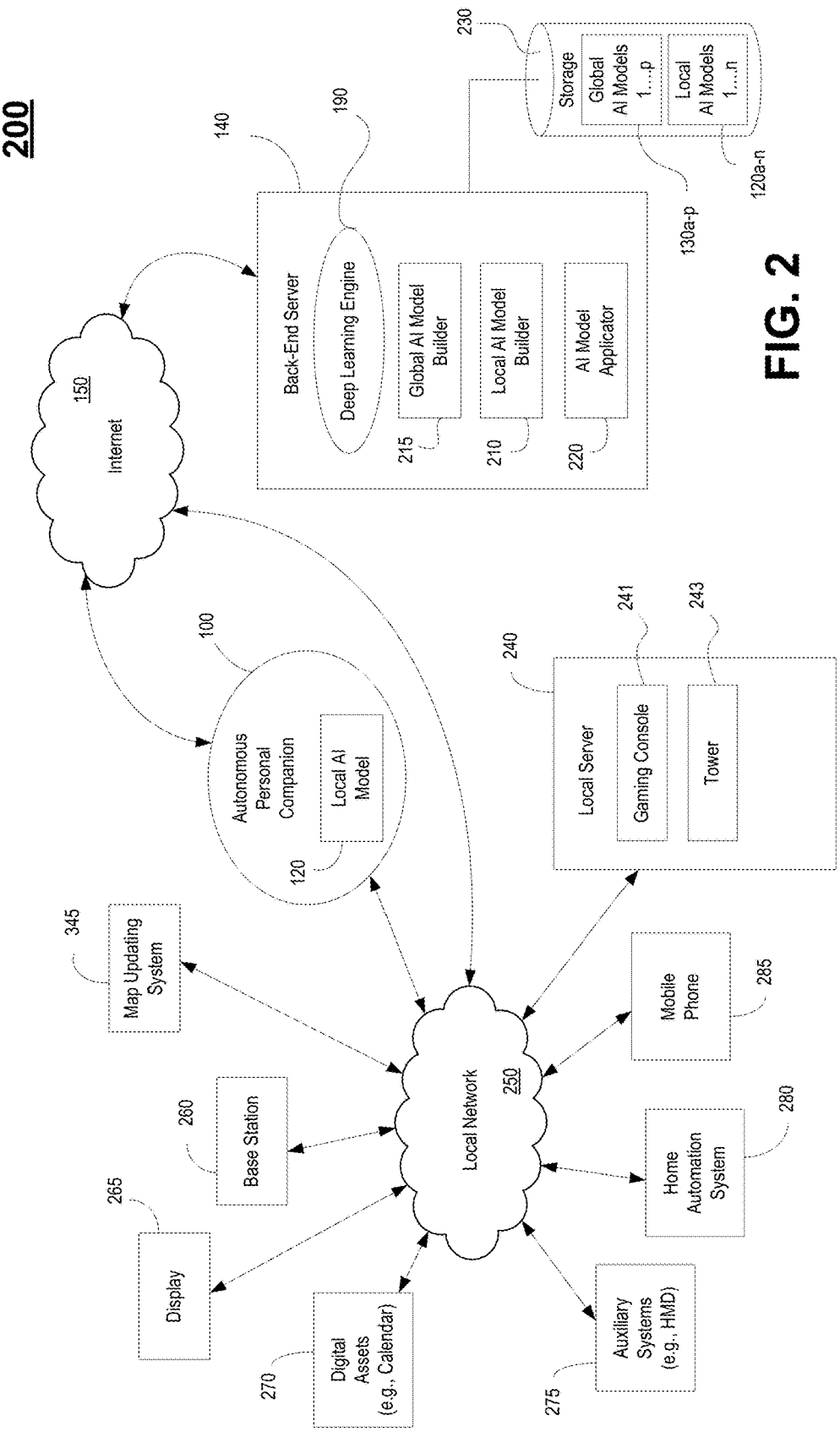
FIG. 2 illustrates a system supporting an autonomous personal companion implemented through an AI model of a user, in accordance with one embodiment of the present disclosure.

FIG. 2 illustrates a system 200 supporting an autonomous personal companion 100 implemented through a local AI model 120 of a corresponding user, in accordance with one embodiment of the present disclosure. The personal companion 100 is configured to provide services to the user based on the local AI model 120 which is capable of predicting among others the responses, actions, behaviors, wants and/or needs of the user through identification of patterns of user behavior that when classified into tags may be used to select a scenario, and provide an AI response considering the scenario that predicts the wants and/or needs of the user and provides services responsive to those wants and/or needs.

As previously described, the personal companion 100 may work independently of or in conjunction with a back-end server 140 that performs modeling of the local AI model 120, and application of the local AI model. In particular, the back-end server 140 includes the deep learning engine 190, previously described, that is configured for learning and/or modeling, in part, the responses, actions, behaviors, wants and/or needs of the user for any given set of inputs (e.g., that define a given scenario driven by or experienced by the user) in order to build and apply a local AI model 120 that supports and provide services to the corresponding user. In particular, the local AI model builder 210 is configured to interface with the deep learning engine to build the one or more local AI models 120a-n that are stored in storage 230. In addition, the global AI model builder 215 is configured to interface with the deep learning engine to build the one or more global AI models 130a-p, previously described, and also stored in storage 230. For example, the AI model builders 210 and 215 may operate to set the parameters defined within the deep learning engine 190 that define the various nodes in the input layer 191, hidden layers 192, and output layer 193, for purposes applying the corresponding AI models within the deep learning engine 190.

The autonomous personal companion 100 may implement the local AI model 120 both within its form factor (e.g., autonomous robot shell) and through the back-end server 140, or a combination thereof. As previously described, companion 100 may implement the local AI model 120 independent of the back-end server, such as when performing less complex AI operations (e.g., a request to turn on the room lights), or when there is limited or no network connectivity. In addition, the companion 100 may implement the local AI model 120 in cooperation with the back-end server. For example, the companion 100 may perform preliminary operations through the local AI model 120 that is localized in order to structure or condition the input parameters (e.g., defining the operations to be performed) so that they are easily delivered (e.g., reduced and/or compressed) to the back-end server 140, wherein most of the artificial intelligence within the AI model 120 is performed by the AI model applicator 220 and/or the deep learning engine 190.

As shown in FIG. 2, the autonomous personal companion 100 is located within the same environment of the user, so that it may provide services to the user. The companion 100 is able to interface with one or more digital or physical objects and/or entities either directly through wired or wireless connections (not shown) or through the local network 250, wherein the network 250 may include wired or wireless connections. FIG. 2 shows the interfacing of companion 100 with various digital and/or physical objects. Additional interfacing with other digital and/or physical objects are contemplated. As shown, companion 100 may interface with the objects in the local environment directly (e.g., wired or wireless peer-to-peer communication) or through a local network 250 (e.g., Bluetooth, Wi-Fi, local area network, etc.) via wired or wireless connections. In addition, local network 250 is communicatively coupled with the wide area network or internet 150 to facilitate communication of the various digital and physical objects communicating through local network 250 to other remote objects (e.g., back-end server 140, other servers, etc.)

For example, the companion 100 may interface with base station 260, such as moving one or both of the base station 260 and the companion 100 to the same or approximately the same location for purposes of recharging the companion 100, or communicating with the base station to receive software updates, as well as other exemplary use cases.

In addition, the companion 100 may interface with a local server 240, wherein the server 240 may include a gaming console 241, tower computer 243, etc. For example, the gaming console 241 may provide a main stream of data to display 265, and may also provide summaries or the complete version of the main stream to the companion 100, so that companion 100 may access helpful information (e.g., gaming assistance) that can be displayed (e.g., through a display of companion 100) or delivered (e.g., audio) to the user simultaneous with the game play of the user. The tower 243 may provide additional features that the companion 100 may control or take advantage of, such as search operations, file storage, etc.

In one embodiment, companion 100 may interface and/or implement a map updating system 375, which may be located within or remote from companion 100. The map updating system 375 is configured to continually map the environment within which the companion 100 is located. For example, the updating may occur as a background process to other applications executing on companion 100. In that manner, as objects move around the environment or are newly introduced into the environment, the map updating system 375 is able to recognize that movement and/or introduction to continually update the mapping of objects and structures within the environment. As such, based in part on the updated mapping, the companion 100 is able to move about the environment without colliding with objects. Movement by companion 100 may be necessary to place the companion in the best position to provide services. For example, companion 100 may need to move closer to a wall that is used to project images, or may need to move closer to the user to better listen to the user for purposes of holding a conversation or responding to requests, etc.

As a further example, companion 100 may interface with one or more digital assets 270, for purposes of controlling operations within those assets or accessing data within those digital assets. For example, a digital asset may include a calendaring feature that is implemented within a processor or operating system, such as through local server 240, in which case, the companion 100 may be tasked to update or create an entry, or obtain imminent calendar dates, etc. on the calendaring feature.

In still another example, the companion 100 may interface with one or more auxiliary systems 275. For example, an auxiliary system 275 may include a head mounted display (HMD), such that the personal companion may receive updates from the virtual reality (VR) content being displayed through the HMD in order to provide additional content to be displayed within the HMD that is consistent with the VR content (e.g., providing information augmenting the VR—implementing augmented reality).

Also, the companion 100 can interface with a home automation system 280 that is configured to automate the functioning of the home (e.g., setting thermostats for heating and cooling, ventilation controls, window coverings, network connectivity, digital content delivery and presentation, home appliances including washers and dryers, etc.). As such, companion 100 may instruct the home automation system 280 to turn off lights in the entertainment room in order to provide the best lighting for a display concurrent with the game play of the user.

In addition, companion 100 may interface with mobile phone 285 to access and/or control various features provided by phone 285. For example, companion 100 may connect with the streaming music feature on phone 285 to broadcast music.

Figure 3A:
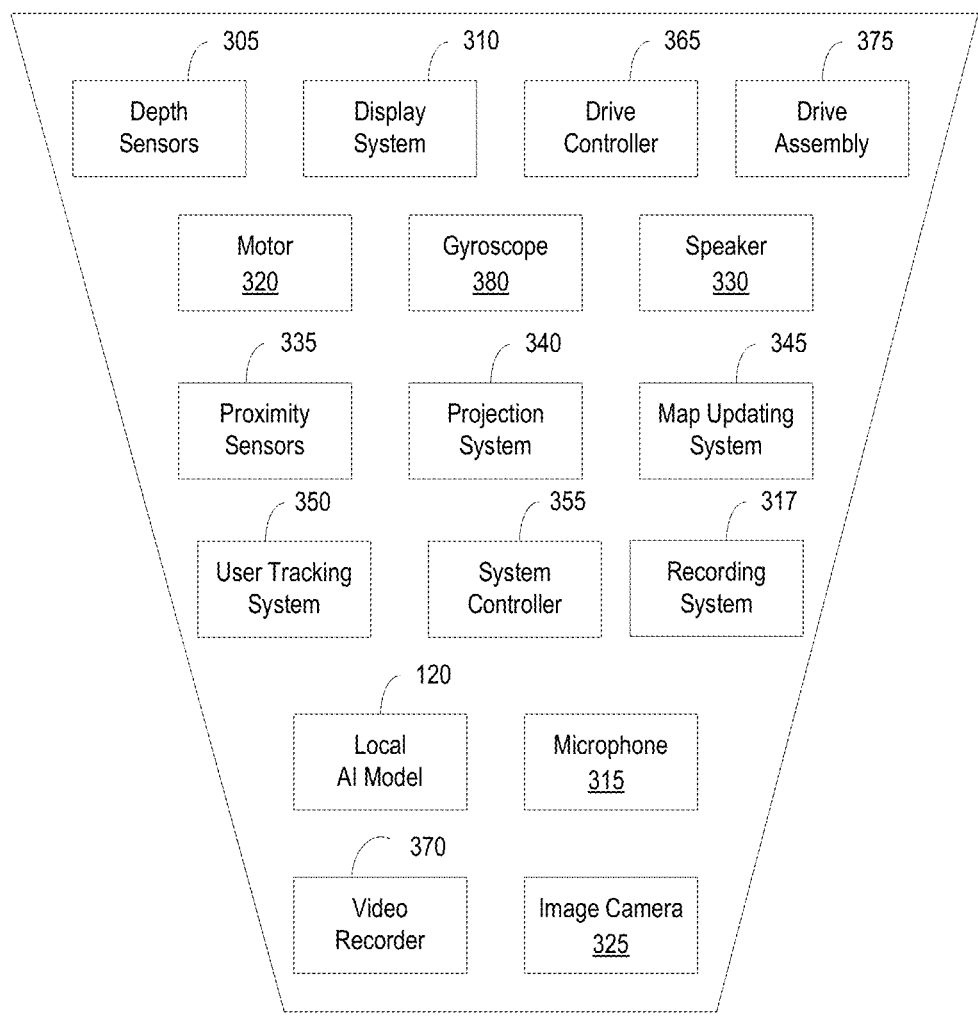
FIG. 3A is a block diagram of an autonomous personal companion that is implemented through an AI model of a user, in accordance with one embodiment of the present disclosure.

FIG. 3A is a block diagram of an autonomous personal companion 100 that is implemented through a local AI model of a user, in accordance with one embodiment of the present disclosure. As previously introduced, the companion 100 is configured to interface with a corresponding user to provide services of any type (e.g., digital, physical, etc.) through a local AI model 120. The local AI model 120 may be a distributed model that cooperates with a back-end server 140 to predict, in part, the behaviors, responses, actions, reactions, wants and/or needs of the user. Though various exemplary components of the companion 100 are shown in FIG. 3A, other functions and/or components are well supported.

As shown in FIG. 3A, companion 100 includes a system controller 355 configured to manage the overall operations. For example, controller 355 may manage the hardware and software resources available for use by the various components in order to facilitate operation of the companion 100. In addition, controller 355 may control one or more of the components (e.g., motor 320, depth sensor 305, etc.) provided within companion 100, including the interfacing and cooperation between the components.

Drive controller 265 is configured to manage the mobility functions implemented by the companion 100. The ability for motion is provided, in part by the motor assembly 320 (e.g., electric, fuel, etc.), or other means for propulsion, and the drive assembly 375 configured to impart motion to the companion 100. In some implementations, drive assembly 275 may include one or more wheels, or other means (e.g., hover capability) configured to provide movement of companion 100. In some cases, gyroscope 380 may provide stability information to the drive controller 365 in order to keep the companion 100 in the correct orientation, while in a stationary position, or while moving.

Companion 100 may include components configured for aiding navigation of the companion through a current environment. For example, depth sensors 305 and proximity sensors 335 may provide information regarding fixed and moving objects in the environment. In particular, proximity sensors 335 may be configured to determine the location of objects (e.g., by detecting surfaces) in close proximity to companion 100. Depth sensors 305 may also be configured to determine the locations of near and far objects within the environment of companion 100. That is, the sensors 305 and 335 are able to determine the depth of objects in relation to a placement of the companion 100 within the environment, and through continual updating generate a mapping of the environment that includes locations of objects (new and updated) within the environment. In addition, depth sensors 305 may be configured to determine the composition of the objects, such as determining whether an object is hard (e.g., metal desk) or soft (e.g., couch). Depth and proximity sensors may employ one of various techniques for determining the location and/or composition of objects within the environment, including the use of electromagnetic fields, induction, radio frequencies, thermal variations, infrared frequencies, air flow, etc. Further, images may be captured by camera 325 and/or video recorder 370 in order to provide object information (e.g., relational positioning of objects), as well as providing other uses and services (e.g., personal image and video capture, video gaming recording, recording of daily activities of user, etc.).

In addition, map updating system 345 may use, in part, the information provided by the depth sensors 305 and proximity sensors 335 in order to map the environment. Other information and/or data may be accessed for purposes of mapping to include architectural blueprints, images captured by camera 325, video recorder 370, etc. Mapping system 345 may be configured to provide a three dimensional (3D) view of the environment. For example, the data collected by the various components and/or third party information can be used to generate one or more types of mapping of the environment. These mapping include two-dimensional and 3D maps. Further, map updating system 375 continually maps the environment using one or more tools (e.g., depth sensors 305 and proximity sensor 335, etc.), as previously described. For example, objects that move around or are introduced into the environment are discoverable, such that locations of the objects are updated into the mapping of the environment. Other types of mappings include images and video tours of the environment. In one embodiment, the information may be used to map out the home of the user, wherein room locations can be determined, walls of the rooms can be classified (e.g., for purposes of determining which can be used as projection screens), actual and virtual images of the various rooms may be stored and provided, and video and virtual tours of the home may be generated (e.g., for purposes of insurance, real estate showings, etc.).

In another embodiment, companion 100 may include a display system 310 for purposes of entertainment, communication, etc. For example, display system 310 may be used for communicating with the user, such as when providing results of an internet search by the user, or querying the user for one or more purposes (e.g., inquiring about the general well-being of user, clarifying various requests by the user, etc.). In addition, display system 310 may be used as a primary gaming display (showing the game play of the user playing a gaming application as streamed by a primary gaming stream from a gaming console), or auxiliary display for providing secondary gaming stream (e.g., information related to the game play of the user). Display system 310 may be configured to show a movie, or other digital content. Display system 310 may work in conjunction with speaker or audio system 330 for providing audio in relation to the images or video provided by the display. For example, audio of the game play of the user may be presented in association with and synchronized with the video of the game play as presented on display.

Further, companion 100 may include a projection system 340 for purposes of entertainment, communication, etc. Projection system may provide similar functionality as display system 310 to include providing communication with the user, or displaying a primary stream from a gaming application as provided by a console or back-end streaming service, providing secondary stream of data (e.g., as an auxiliary screen to a gaming application providing secondary or supplementary information, or providing an expanded view of the gaming world in conjunction with a primary display), displaying digital content, etc. In addition, other features may be provided through the projection system 340. Because the projected images can be larger vs. a display system, expanded viewing options may be provided. For example, different types of videos and/or imaging (e.g., holographic, 3D, etc.) may be presented through the projection system 340 of companion 100.

Recording system 317 is configured to capture video and/or audio of digital information collected and/or generated by companion 100. For example, the game play (e.g., video and audio) of the user playing a gaming application may be collected and stored. Additional information may be collected by recording system 317, such as additional audio from the user as the user is playing the gaming application, and joined with the video and audio of the game play.

In addition, a user tracking system 350 may be configured to track general and specific movement of the user. General movement includes overall body movement of the user within the environment. Specific movement may be targeted to a part of the body, such as determining the movement of the head, or torso of the user. For example, tracking system may determine orientation of the various body parts of the user, and track the turning of the head or body. Tracking system 350 may collect data provided by one or more other components, including images and video from camera 325 or video recorder 370, depth sensors 305, proximity sensors 335, or other tracking sensors (e.g., integrated or third party sensors—such as provided through a gaming console), etc.

Figure 3B:
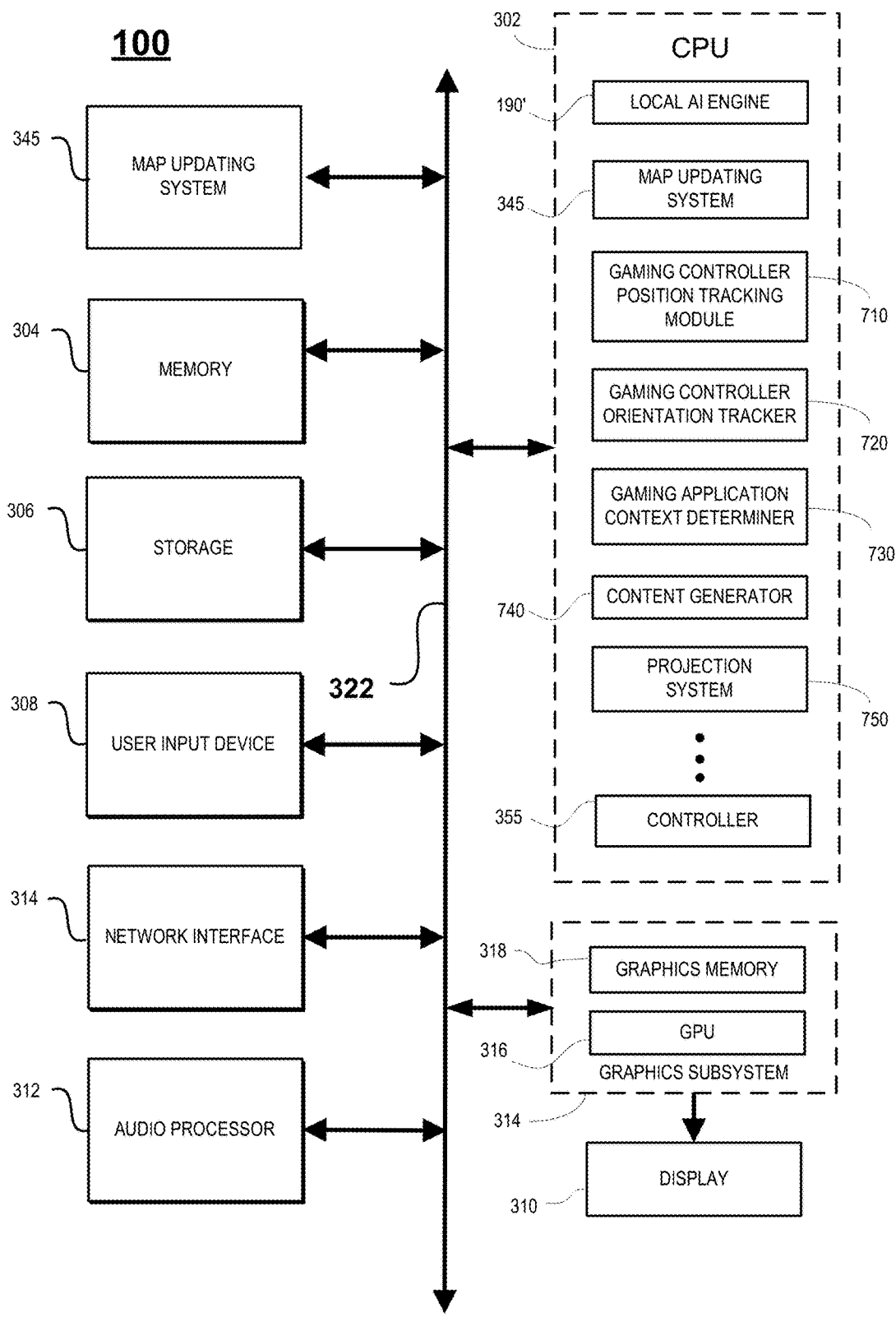
FIG. 3B illustrates components of an example device 100 that can be used to perform aspects of the various embodiments of the present disclosure.

FIG. 3B illustrates components of an example device 100 that can be used to perform aspects of the various embodiments of the present disclosure. For example, FIG. 3B illustrates an exemplary hardware system suitable for implementing a device that provides services in support of a user, wherein the device is configured to provide services as implemented through a local AI model that is capable of predicting, in part, the behaviors, actions, reactions, responses, wants and/or needs of a corresponding user, in accordance with one embodiment. This block diagram illustrates a device 100 that can incorporate or can be a personal computer, video game console, personal digital assistant, or other digital device, suitable for practicing an embodiment of the disclosure. Device 100 includes a central processing unit (CPU) 302 for running software applications and optionally an operating system. CPU 302 may be comprised of one or more homogeneous or heterogeneous processing cores.

In accordance with various embodiments, CPU 302 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 302 may be configured to include the localized AI engine (e.g., deep learning) engine 110 that is configured to support and/or perform learning operations with regards to predicting, in part, user behavior, actions, responses, reactions, wants and/or needs of the user and provide services based on that prediction. Also, AI engine 110 is configured to apply the local AI model 120 of the user at the companion 100. In addition, CPU 302 may provide additional functionality as provided by one or more of components of companion 100 as shown in FIG. 3A, such as the controller 355, drive controller 365, map updating system 345, etc.

CPU 302 may also provide additional functionality related to the augmentation of a gaming controller with content that may be related to a gaming application and/or game play of the gaming application by a user who is controlling the game play using the gaming controller. For example, the augmentation may include the projection of the content onto the controller, such as projecting controller button information onto a displayable surface adjacent to the controller button. In some embodiments, the projection of the content is performed by an autonomous personal companion. For example, CPU 302 include a gaming controller position tracking module 710 that is configured for tracking a position of a gaming controller within a reference system; a gaming controller orientation tracker 720 configured for tracking the orientation of the gaming controller within the reference system; a gaming application context determiner 730 configured for determining information related to a gaming application and/or determining the context of a game play of the gaming application; a content generator 740 configured for generating content (controller button functionality, hints and tips related to the current context of game play) related to the gaming application and/or context of the game play; and a projection system 750 that is configured for projecting the content onto the gaming controller. A more detailed description of these components is provided in FIGS. 7A-7C. In particular, based on acquired information related to a gaming application or game play of the gaming application by a user (e.g., context of the game play) the gaming controller position tracking module 710, gaming controller orientation tracker 720, gaming application context determiner 730, content generator 740, and projection system 750 are configured to provide services that augment a gaming controller, such as by projecting content onto the controller by a projection and vision system of an autonomous personal companion, wherein the content may be related to a gaming application and/or game play of the gaming application, such as controller button information that is projected onto a displayable surface adjacent the controller button.

As shown, the map updating system 345 may be implemented through a hardware based device located within the companion 100. In particular, the map updating system 345 is configured to generate a mapping of the environment within which the companion 100 is located. This mapping may include a localized positioning system, such as a newly generated and/or formatted coordinate system defining the positions within space of the environment. For example, the coordinate system may incorporate values of a global positioning system (GPS), or a 3D Cartesian coordinate system, a mix of systems (e.g., floor plan defining rooms of a building interfaced with individual coordinate systems for each room), or any suitable positioning system.

Memory 304 stores applications and data for use by the CPU 302. Storage 306 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 308 communicate user inputs from one or more users to device 100, examples of which may include keyboards, mice, joysticks, touch pads, touch screens, still or video recorders/cameras, and/or microphones. Network interface 314 allows device 100 to communicate with other computer systems via an electronic communications network, and may include wired or wireless communication over local area networks and wide area networks such as the internet. An audio processor 312 is adapted to generate analog or digital audio output from instructions and/or data provided by the CPU 302, memory 304, and/or storage 306. The components of device 100, including CPU 302, memory 304, data storage 306, user input devices 308, network interface 310, and audio processor 312 are connected via one or more data buses 322

A graphics subsystem 314 is further connected with data bus 322 and the components of the device 100. The graphics subsystem 314 includes a graphics processing unit (GPU) 316 and graphics memory 318. Graphics memory 318 includes a display memory (e.g., a frame buffer) used for storing pixel data for each pixel of an output image. Graphics memory 318 can be integrated in the same device as GPU 316, connected as a separate device with GPU 316, and/or implemented within memory 304. Pixel data can be provided to graphics memory 318 directly from the CPU 302. Alternatively, CPU 302 provides the GPU 316 with data and/or instructions defining the desired output images, from which the GPU 316 generates the pixel data of one or more output images. The data and/or instructions defining the desired output images can be stored in memory 304 and/or graphics memory 318. In an embodiment, the GPU 316 includes 3D rendering capabilities for generating pixel data for output images from instructions and data defining the geometry, lighting, shading, texturing, motion, and/or camera parameters for a scene. The GPU 316 can further include one or more programmable execution units capable of executing shader programs. In one embodiment, GPU 316 may be implemented within AI engine 190' to provide additional processing power, such as for the AI or deep learning functionality.

The graphics subsystem 314 periodically outputs pixel data for an image from graphics memory 318 to be displayed on display device 310, or to be projected by projection system 340. Display device 310 can be any device capable of displaying visual information in response to a signal from the device 100, including CRT, LCD, plasma, and OLED displays. Device 100 can provide the display device 310 with an analog or digital signal, for example.

It should be understood that the embodiments described herein may be executed on any type of client device. In some embodiments, the client device is a head mounted display (HMD), or projection system.

Figure 4B:
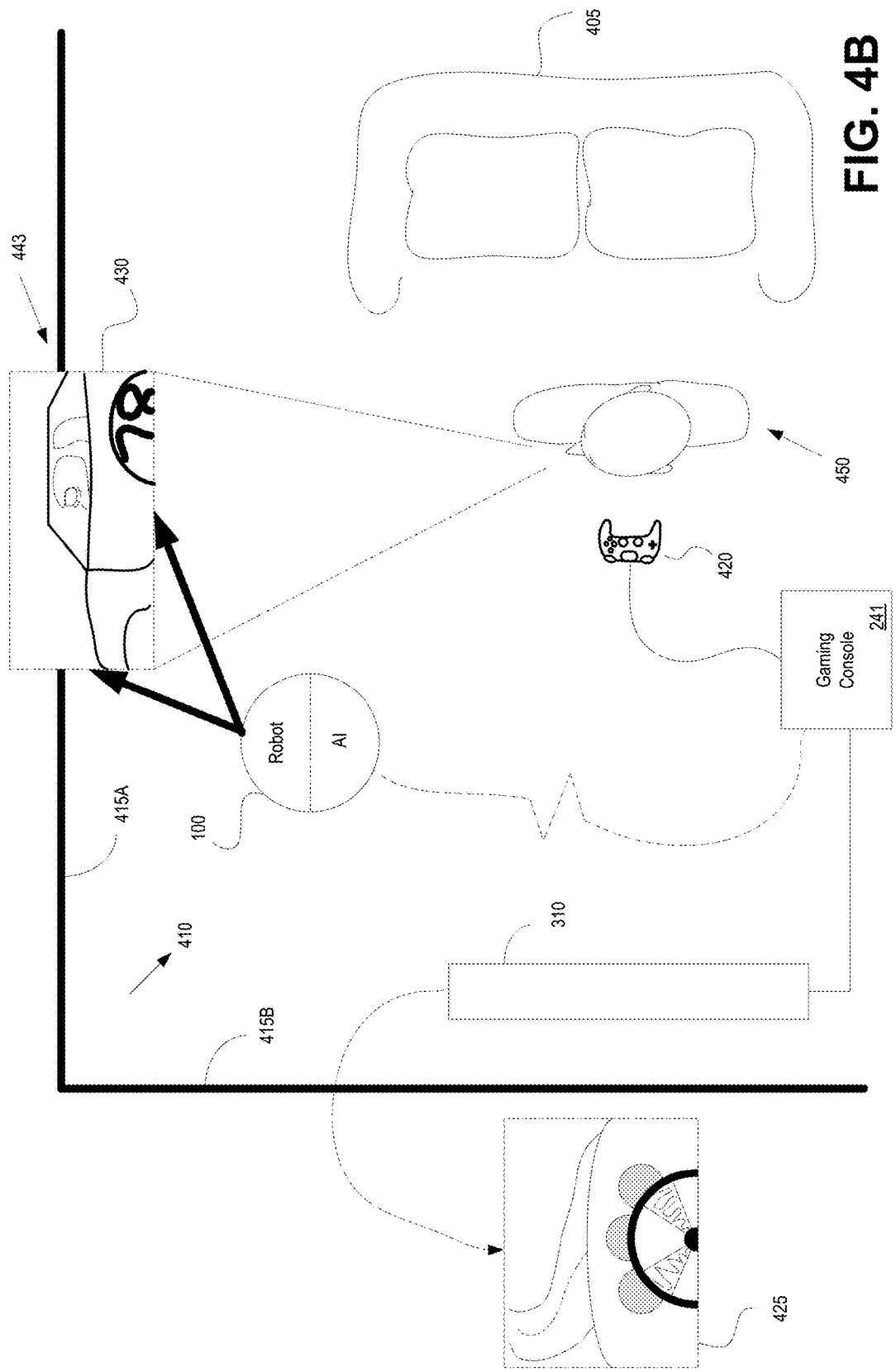
FIG. 4B illustrates the integration of a three-dimensional (3D) gaming world of the gaming application, played by the user introduced in FIG. 4A, and the physical environment of the user, wherein the autonomous personal companion is configured to project a portion of the 3D gaming world into the physical environment in response to a direction of the gaze of the user, in accordance with one embodiment of the present disclosure.
Figure 4C:
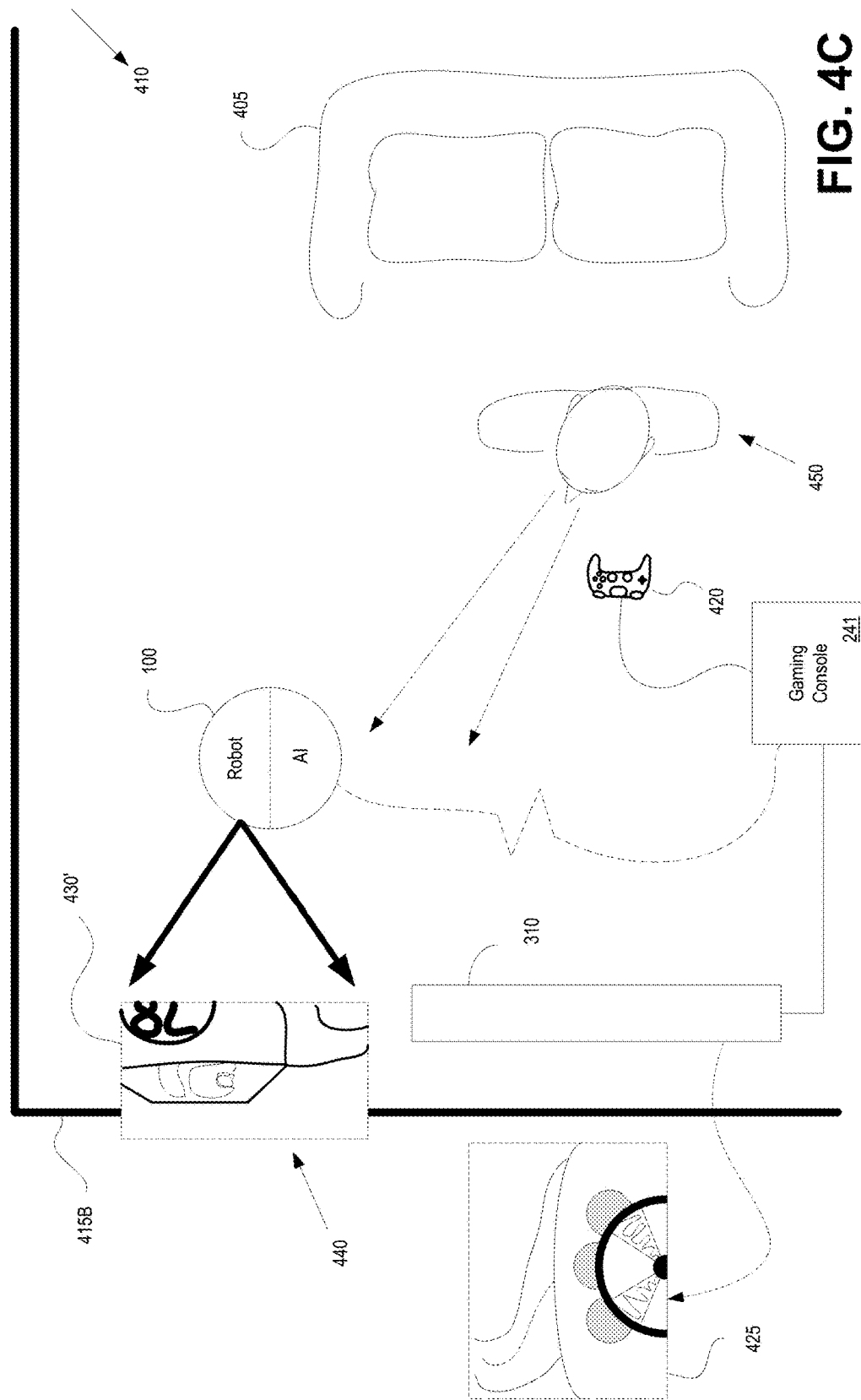
FIG. 4C illustrates another example of the integration of the 3D gaming world of the gaming application introduced in FIGS. 4A-4B, wherein an extension of the 3D gaming world of the gaming application is projected alongside a display, wherein the display shows the main view of the gaming application, wherein the extension shows a portion of the 3D gaming world, or provides supplemental information to the gaming application, in accordance with one embodiment of the present disclosure.

FIGS. 4A-4C illustrate exemplary implementations of an autonomous personal companion 100 within a home environment of a corresponding user, in accordance with one embodiment of the present disclosure. As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Though companion 100 is configured to provide a variety of services under various scenarios, FIGS. 4A-4C show a scenario where a user 450 is playing a gaming application that is executing on a gaming console 241 (or executed at a back-end server and streamed through the gaming console), and where companion 100 is capable of providing supplementary information to the game play of the user 450.

As shown, the user is located in a home environment 410, such as an entertainment room. The room includes two walls 415A and 415B. The environment 410 includes a couch 405. The user has access to a gaming console 241. In particular, the gaming application is executing and/or streaming through gaming console 241 (or any other device) in association with game play of the user 450, wherein the game play is responsive to user input, such as through controller 420. A primary stream of the game play is created, wherein video of the game play is delivered to display 310. In addition, audio of the game play may be provided through an audio system (not shown). The gaming application may be an open road racing game, wherein the user is playing a driver of a car in the race. Screen shot 425 shows an image of the video stream delivered to the display 310, and includes a view out of the front windshield and over the dash of the race car that shows the oncoming road, as well as the steering wheel and various instruments in the dash.

In addition, companion 100 is located in the environment 410, and includes a robot form factor 105 and AI 110 that is configured to implement a local AI model 120 of user 450. For example, AI 110 may be AI engine 190' that cooperates with AI engine 190 at back-end server 140. The local AI model 120 as implemented through AI 110 is configured to provide, in part, services to user 450 related to the game play. As such, companion 100 may be communicatively coupled to gaming console 241 at least to receive information about the gaming application and/or game play. For example, the information may include the title and version of the game, the game state of the game play. In addition, companion 100 may include information provided in a secondary stream of the gaming application. For instance, gaming console 241 may generate a primary stream for presentation on display 310 and a secondary stream that is presented (e.g., via display, projection, speaker, etc.) through companion 100.

In one embodiment, companion 100 is configured to provide supplemental supporting the game play of a user, wherein the information may be related to game plays of the user and other players playing the gaming application. The information may provide general information related to the gaming application, in some implementations. The supplemental information may provide assistance to the user 420 in advancing the game play. For example, the assistance may be in the form of coaching to help the user 420 achieve a goal (e.g., pass a level), and may include visual cues showing controller inputs that generally or directly help the user achieve the goal within the gaming application. A detailed description of the supplemental information as provided through a companion application is provided in co-pending patent application entitled "GAME PLAY COMPANION APPLICATION," U.S. patent application Ser. No. 15/476,597, filed on Mar. 31, 2017, herein incorporated by reference in its entirety.

FIG. 4B illustrates the autonomous personal companion 100 interfacing with the gaming console 241 to provide supplemental information related to the game play of user 450, as introduced in FIG. 4A. For instance, FIG. 4B shows user 450 within environment 410 playing a gaming application executed on or streamed through gaming console 241. In particular, FIG. 4B illustrates the integration of a three-dimensional (3D) gaming world of the gaming application, and the physical environment of the user. As shown, companion 100 is configured to project a portion of the 3D gaming world of the gaming application into the physical environment 410. For instance, companion 100 is able to extend the view of the 3D world beyond what is presented on display 310, which continues to show screen shot 425. In particular, companion 100 projects a video stream (including screen shot 430) as a secondary stream of the gaming application, simultaneous with the primary video stream presented on display 310 (and including screen shot 425).

In addition, the projection provided by companion 100 may be made in response to a direction of the gaze of the user 450, in accordance with one embodiment of the present disclosure. For instance, a gaze tracking system of companion 100 or working in conjunction with companion 100 is configured to capture the direction of the gaze of user 450 during the game play. As an illustration, as the user is racing, a sound may be directionally provided within environment 410, which may trigger head movement. As shown, the head of user 450 is turned dramatically to the right. Other triggers are supported, such as an arrow pointing to the right side, as displayed within the primary stream on display 310. For example, a sound locator and projection system in companion 100 may produce a sound that originates, or is made to originate from a location in environment 410 that also corresponds to a point of origin within the gaming world of the gaming application. The sound may be from the engine of a competitor that is trying to pass the driver controlled by user 450, and may originate to the right of the driver, or more specifically from the right side of the cockpit. As the head of the user turns to the right to gain a better view of the passing racer, a projection of that portion of the gaming world as viewed from the standpoint of the user 450 is presented on wall 415A in area 443, wherein the projection is presented in approximately the proper location of the objects in the gaming world and in relation to a location of the character played by the user, wherein the character location is associated with a physical location of the user 450. As shown, a screen shot 430 of the projection of the secondary information includes Race Car No. 78 passing on the right side.

In one embodiment, area 443 may have been discovered during a mapping process of environment 410 previously accomplished. The mapping process discovered that area 443 may be suitable for displaying supplemental information and/or content. Companion 100 may position itself with respect to wall 415A and/or user 450 in environment 410 to properly present the supplemental information.

FIG. 4C illustrates another example of the integration of the 3D gaming world of the gaming application introduced in FIGS. 4A-4B, wherein an extension of the 3D gaming world of the gaming application is projected alongside display 310 showing the primary stream of the game play of user 450, in accordance with one embodiment of the present disclosure. As shown, instead of projecting the secondary or supplemental information on wall 415A, the information is projected on wall 415B, just to the right of display 310. For example, during the mapping process of environment 410, it may be determined that wall 415A cannot support projection of images. That is, even if companion 100 projected onto wall 415A, the video stream would not be viewable (e.g., wall 415A contains a bookcase). As such, companion 100 may project the supplemental information on wall 415B in an area 440 that still somewhat conveys the proper sense of location of the objects in the projection in the gaming world, especially in relation to the display 310 showing the primary video of the gaming application. In another implementation, the projection is an extension of the video stream presented on display 310. As such, companion 100 projects the supplemental video stream onto area 440, to include the screenshot 430', which is analogous to screenshot 430 of FIG. 4B, that includes the Race Car No. 78 in a passing position. Screenshot 430' is projected to the right side of the cockpit, as represented by the point-of-view (e.g., screenshot 425) of the character driver presented on display 310.

In one embodiment, the projection onto wall 415B may be triggered by the gaze of user 450 off-center from display 310. As shown, the head of user 450 is not turned approximately 90 degrees, as it would be in the gaming environment, but more like 45 degrees to view area 440 of wall 415B. In other embodiments, the projection may be autonomously produced by companion 100 during the execution of the gaming application. For example, the supplemental information may be automatically projected by companion 100 to provide an enhanced user experience. In that case, other supplemental information may be provided at other locations within environment 410 at other times.

Figure 5:
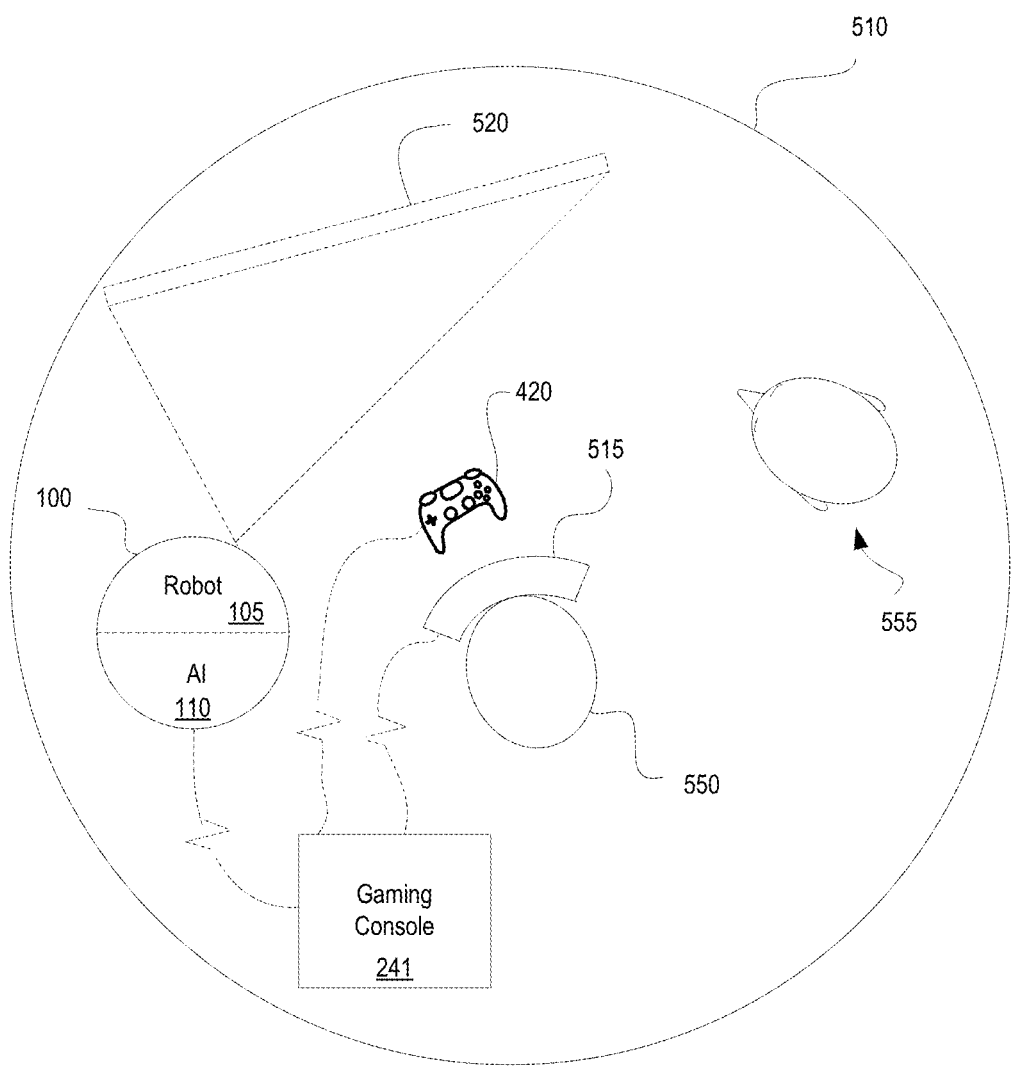
FIG. 5 illustrates the integration of a 3D virtual reality (VR) world of a gaming application played by a first user using a head mounted display (HMD) and the physical environment, wherein an autonomous personal companion is configured to project a portion of the VR gaming world into the physical environment in response to a direction of the gaze of the user to allow a spectator to have a parallel participation in the experience of VR gaming world of the first user, in accordance with one embodiment of the present disclosure.

FIG. 5 illustrates the integration of a 3D virtual reality (VR) world of a gaming application played by a user 550 using a head mounted display (HMD) 515 and the physical environment 510, in accordance with one embodiment of the present disclosure. As shown in FIG. 5, user 550 is playing a gaming application that is executing on gaming console 241 (or executed at a back-end server and streamed through the gaming console, or through any other device) in association with game play of user 550, wherein the game play is responsive to user input, such as through controller 420 and/or movement of the HMD 515.

As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Companion 100 includes a robot form factor 105, and artificial intelligence for implementing the AI model 120 corresponding to the user 550.

More particularly, companion 100 is configured to project a portion of a virtual reality (VR) gaming world of the gaming application into the physical environment 510. For example, the projection 520 of the VR gaming world may be made onto a wall (not shown) in the environment 510. The projection 520 may also be made through a physical display that is controlled by companion 100. In this manner, the view as experienced by the user 550 may also be presented to the spectator 555. In one embodiment, the projection is made in response to a direction of the gaze of the user 550 to allow spectator 555 to have a parallel participation in the experience of VR gaming world of user 550, in accordance with one embodiment of the present disclosure. As such, if the environment 510 is suitable for projection, as the user 550 changes orientation when viewing the VR gaming world, companion 100 may also change the projection 520 to a different location within environment 510 to closely correspond to the proper location in the VR gaming world. That is, if the head of user 550 turns 90 degrees counter-clockwise, the projection 520 may be made on a wall that is to the left of user 550, and also to the left of spectator 555. In that manner, spectator may gain a sense of the VR gaming world as projected by companion application into the physical environment 510.

FIGS. 6A-6E illustrate various exemplary forms of autonomous personal companions, wherein the companions may be implemented through companion 100 as shown in FIGS. 1-5, in accordance with embodiments of the present disclosure. The companions shown in FIGS. 6A-6H are configured to provide services to a corresponding user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user.

Figure 6A:
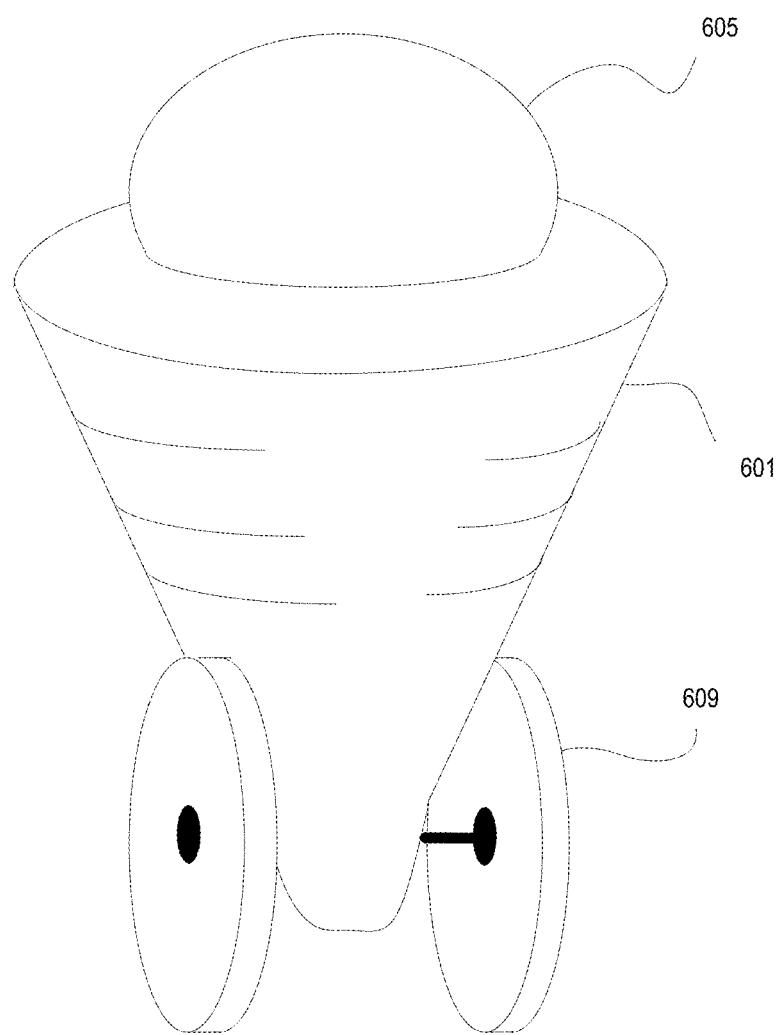
FIG. 6A illustrates an exemplary form of an autonomous personal companion for a user that is implemented through an AI model of the user, in accordance with one embodiment of the present disclosure.

In particular, FIG. 6A illustrates an exemplary form of companion 600A for a user that is implemented through an AI model of the user, in accordance with one embodiment of the present disclosure. Though FIG. 6A shows a generic form factor, companion 600A may be implemented within any suitable form factor. For example, body 601 is shown having a conical shape with the lower portion of smaller diameter than an upper portion. An upper housing 605 may protrude from body 601 to facilitate additional features of companion 600A.

In particular, companion 600A includes one or more wheels 609 in the lower portion, or any suitable means for providing mobility in two or three dimensions for companion 600A. In that manner, companion 600A may move around within environment as necessary to provide its services. For example, companion 600A may independently move around an environment to capture the best images of the environment, or to select the best location for projecting video and/or images. In addition, body 601 may rotate in one location to provide the best orientation for companion 600A within the environment.

Figure 6B:
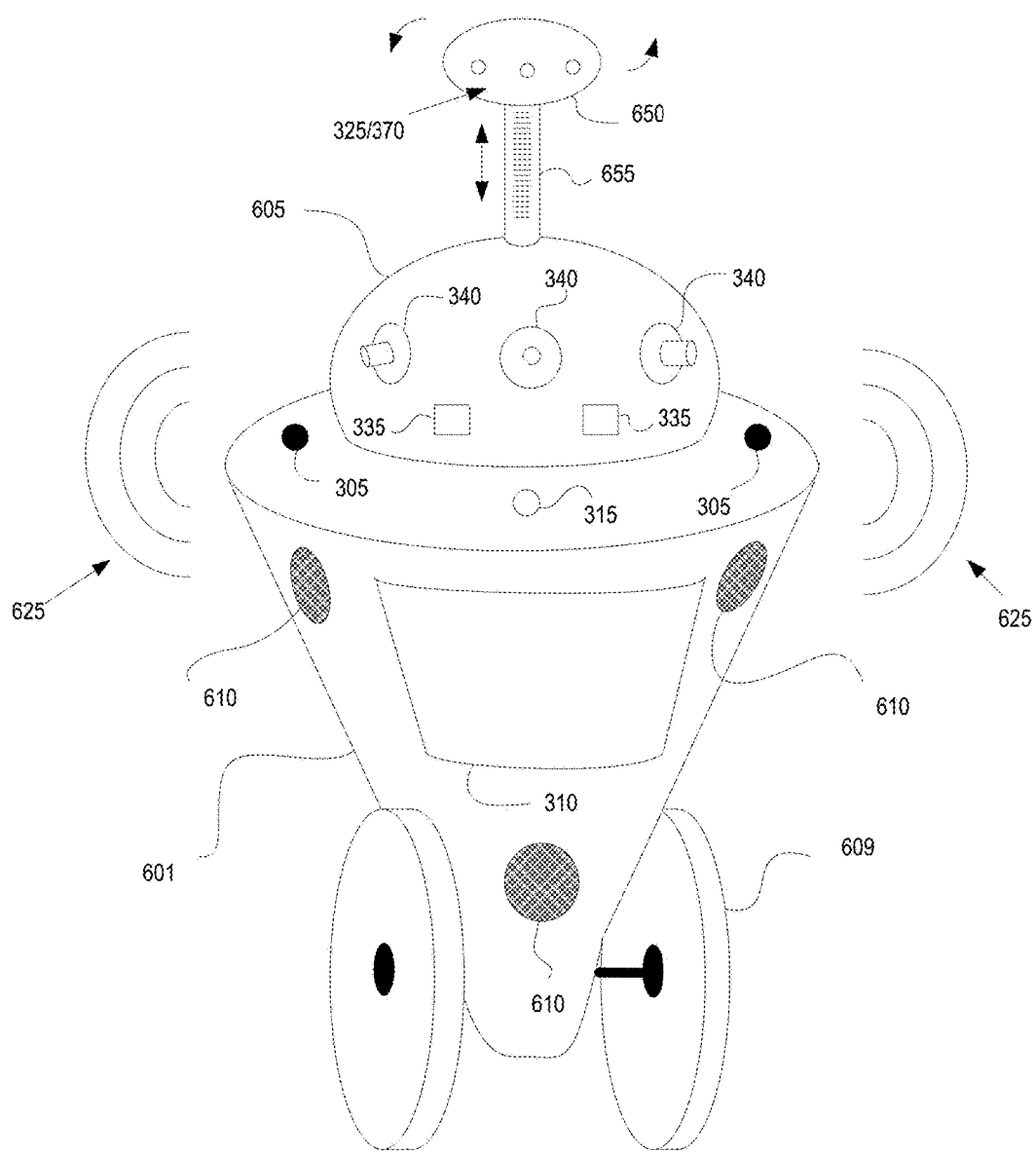
FIG. 6B illustrates an exemplary autonomous personal companion configured with an array of capabilities to include, in part, the projection of images, the sensing of the proximate environment, and the providing of auxiliary sound, in accordance with embodiments of the present disclosure.

FIG. 6B illustrates an exemplary autonomous personal companion 600B configured with an array of capabilities to include, in part, the projection of images, the sensing of the proximate environment, and the providing of auxiliary sound, in accordance with embodiments of the present disclosure. In particular, companion 600B is shown having the generic form factor with body 601, and first introduced in FIG. 6A. In addition, wheels 609 are shown to represent the ability for motion through an environment.

Companion 600B includes speakers 610 arranged throughout body 601. In addition, speakers 610 may be located in other portions of companion 600B, such as in upper housing 605. Display 310 is located on the surface of body 601, and is configured to present information and/or data when performing services for the corresponding user. For example, display 310 may display text when querying the user for a response, or present video or text in response to a query from the user. Display 310 may also present other supplementary information, such as that generated in association with the game play of a user playing a gaming application.

Companion 600B includes one or more sensors used to sense the environment, wherein the sensors may be located at various locations on the companion surface. For example, depth sensors 305 may be located on the surface of the upper portion of body 601, wherein the depth sensors are configured to determine locations of near and far objects within the environment. One or more depth sensors 305 may also be used to determine the composition of the objects, or the surface hardness of the objects. In addition, one or more proximity sensors 335 may be located in the surface of the upper housing 605, wherein the proximity sensors may be configured to determine the location of objects near to the companion 600B. As previously described, depth and proximity sensors may employ various techniques (e.g., electro-magnetic fields, induction, radio frequencies, thermal variations, infrared frequencies, air flow, etc.), as shown by signals 625, to determine locations of objects.

In addition, the upper portion of body 601 includes one or more microphones 315, configured for capturing audio recordings of the environment. For example, audio of the corresponding user may be recorded to capture the live reactions of the user, which may be replayed at a later time. Also, recorded audio may be synchronized with recorded video captured by video recorder 370 located in capsule 650. Also, image camera 325 may be located in capsule 650. The combination of image camera 325 and video recorder 370 allows companion 600B to capture video and/or images of the user and/or environment.

As shown, capsule 650 has various degrees of motion and orientation. Capsule 650 is attached to lift mechanism 655, and can move up and down in relation to body 601 of companion 600B. For example, capsule 650 may raise itself to gain a better view of the environment, such as when camera 325 or recorder 370 are blocked by an object (e.g., wall, couch, furniture, book case, etc.). In addition, capsule 650 may rotate about the shaft of the lift mechanism 655, such that the rotation may occur in relation to a static body 601.

Upper housing of companion 600B may include one or more projection systems 340. As previously described, projection systems 340 may project supplementary information onto a surface of the environment (e.g., wall of a room). The surface may be determined through a mapping of the environment, as previously described. The supplementary information may be used for communicating with the user when the companion 600B is providing services to the user.

Figure 6C:
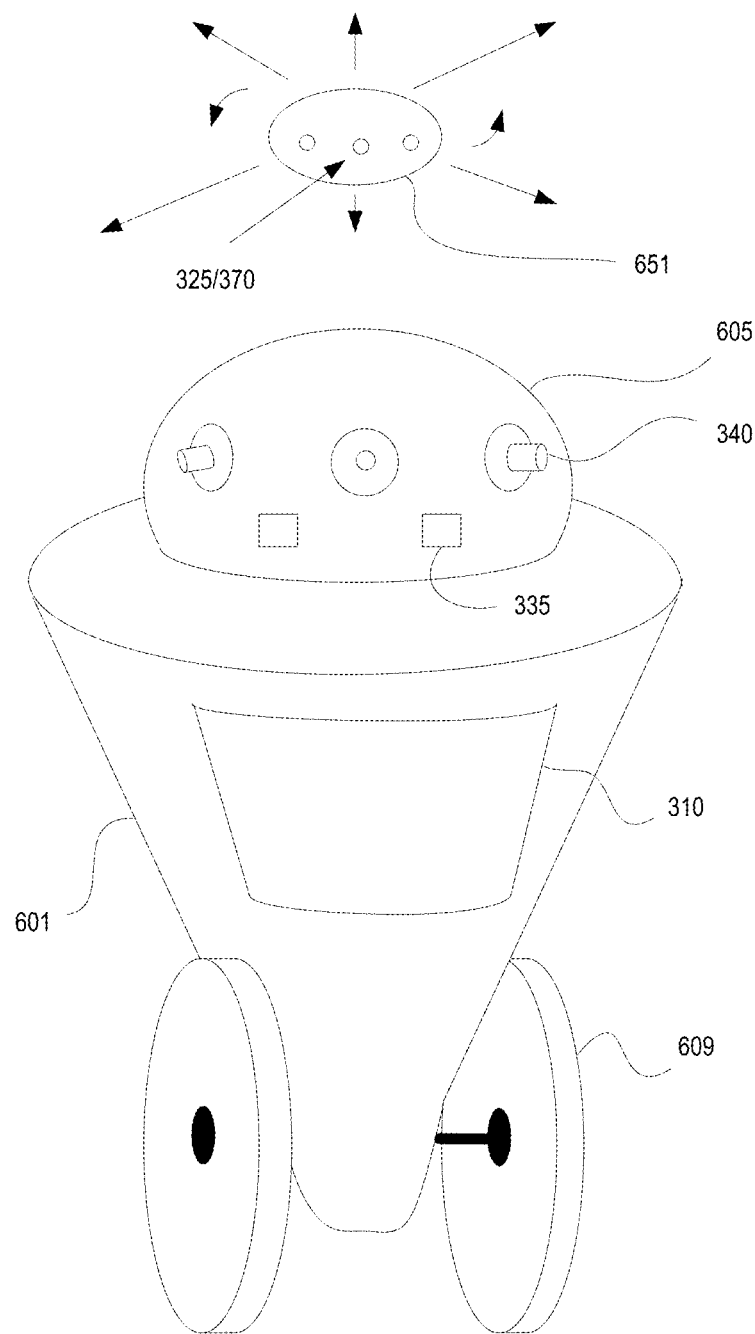
FIG. 6C illustrates an exemplary autonomous personal companion including a drone assembly that is configured with one or more features, for example image capturing and image projection, in accordance with one embodiment of the present disclosure.

FIG. 6C illustrates an exemplary autonomous personal companion 600C including a drone assembly 651 that is configured with one or more features, for example image capturing and image projection, in accordance with one embodiment of the present disclosure. As shown, companion 600C has one or more features previously introduced, to include a body 601 generically represented, means for movement (e.g., wheels 609 as shown), a display 310, proximity sensors 335, and projectors of a projection system 340. Other features previously introduced are not shown for purposes of clarity.

In particular, companion 600C includes drone assembly 651 that is coupled to upper housing 605 (or any other suitable surface area capable of receiving assembly 651) when in a resting position. For instance, drone assembly 651 may interface with upper housing 605 for purposes of charging a battery. Other resting locations are contemplated that are remote from companion 600C, such as a separate base station. Further, drone assembly 651 is communicatively coupled to one or more components of the companion 600B, such as controller 355. Image camera 325 and/or video recorder 370 may be located on drone assembly 651 for purposes of capturing images and video. Other components may also be located on assembly 651, such as a projector of the projection system 640.

As shown, drone assembly 651 is able to move about within the environment. Any suitable means for providing movement are contemplated, such as propeller systems, air flow systems, light air systems, tethering systems, etc. As such, drone assembly 651 is able to move in three dimensions throughout the environment, and rotate itself within the environment. Movement may be necessary in order to place the camera 325 and/or video recorder 370 in a better position for capturing images and/or video. For example, the view of a room in a certain direction as taken from a point corresponding to body 601 and upper housing 605 of companion 100 may be blocked by an object. The drone assembly 651 may be deployed to a location that is not obstructed by the object (e.g., straight up) in order to capture the view.

Figure 6D:
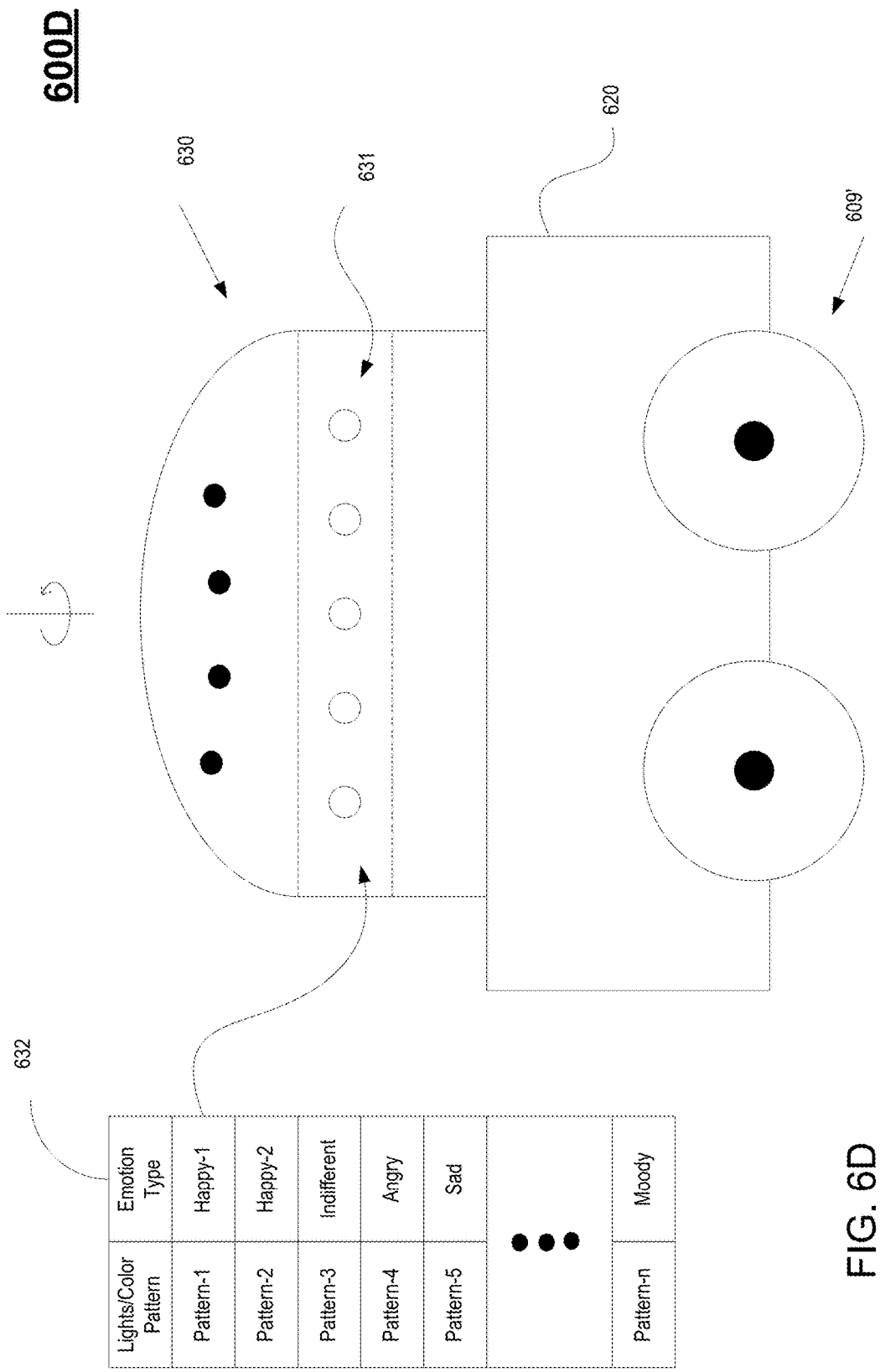
FIG. 6D illustrates an exemplary autonomous personal companion including a rotating top portion configured with one or more features, for example image capturing and image projection, in accordance with one embodiment of the present disclosure.

FIG. 6D illustrates an exemplary autonomous personal companion 600D including a rotating top portion 630 configured with one or more features, in accordance with one embodiment of the present disclosure. Companion 600D is shown to illustrate different form factors suitable for implementing the local AI model 120 of a corresponding user. As shown, companion 600D includes a base 620. Mobility means are provided within base 620, such as wheels 609', or any other suitable means for motion previously described.

In particular, companion 600D include top portion 630, which may include cameras 325, video recorders 370, depth sensors 305, proximity sensors 335, etc. For illustration, top portion 630 may be rotatable about the base 620. In that manner, companion 600D may orient itself to best provide services to a user (e.g., place itself in a good position for communicating with user). That is, combining the mobile features of companion 600D and the rotating top portion 630, a variety of orientations are possible of the companion within its environment. For example, top portion 630 may be rotated towards an object in the environment to give a camera system a good view of the object. Further, companion 600D may move closer to the object to give the camera system a better view of the object.

In some implementations, rotation of the top portion 630 is able to convey emotion or display some behavior of the companion 600D. In that case, top portion 630 may be outfitted with multi-colored lighting that are programmed to show emotion. For example, a band of lights 631 is shown on top portion 630. Each of the lights in band 631 may be turned on or off according to a corresponding pattern. In addition, each of the lights in band 631 may show a sequence of colors according to corresponding pattern. Table 632 shows a list of light patterns (e.g., on/off, color sequence, etc.), wherein each pattern may be associated with a corresponding emotion of the companion 100. For example, pattern-1 may be associated with a first happiness emotion, and pattern-2 may be associated with a second type of happiness. Other emotions may be exhibited through other patterns, such as showing indifference, angriness, sadness, moodiness, etc.

Figure 6E:
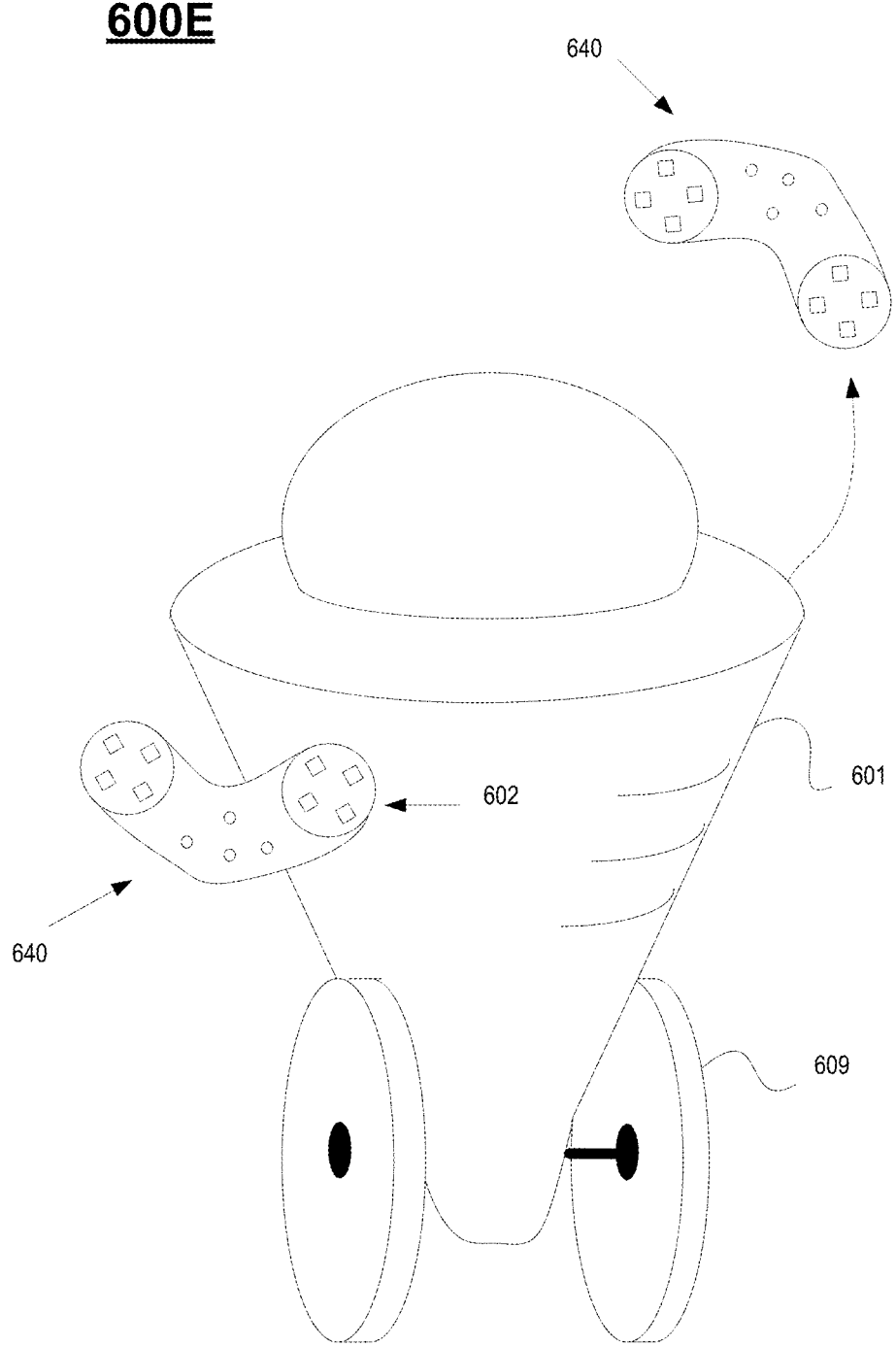
FIG. 6E illustrates an exemplary autonomous personal companion including one or more appendages, wherein the appendages may take the form of controllers, wherein the appendages/controllers may be removable from the companion, in accordance with one embodiment of the present disclosure.

FIG. 6E illustrates an exemplary autonomous personal companion 600E including one or more appendages 640, in accordance with one embodiment of the present disclosure. As shown, companion 600E has one or more features previously introduced, to include a body 601 generically represented, and means for movement (e.g., wheels 609 as shown). Other features previously introduced are not shown for purposes of clarity.

In particular, appendages 640 may provide controller functionality. For example, appendage 640 may include controller 420, and may interface with gaming console 241 for purposes of providing control instructions during the execution of a gaming application on gaming console or at a back-end server. In one embodiment, one or more of appendages 640 may be removed for easier manipulation and handling. In that manner, the user may interface with appendage 640 in the normal manner of handling a gaming controller.

In one embodiment, each appendage 640 is configured with a recharging port that is capable of coupling to a base charging port. An internal battery (not shown) is located within the corresponding appendage 640. The base charging port may be located on body 601, such as within connections associated with pivot point 602. In that manner, as the appendage 640 is replaced back onto the body 601, charging of the internal battery may occur. That is, power (e.g., electric charge) is transferred through the body 601 of companion 600E to the internal batter of appendage 640, in one embodiment. In another embodiment, power is transferred in the opposite direction, such that power is transferred from the internal battery to the companion 600E. In that manner, appendage 640 may be configured as the primary recharging medium for supplying power to companion 600E, and may be removed to be electrically and/or communicatively coupled to a base charging station separate from body 601. While appendage 640 is decoupled (e.g., recharging), companion 600E may continue to operate using an internal battery source, wherein the battery source can be recharged once appendage 640 is again coupled to body 601.

In one embodiment, appendages 640 act as arms for companion 600E. For example, appendage 640 may move about a pivot point 602 on body 601. Movement of appendage 640 may provide some communication. For instance, a pattern of movement of appendage 640 may signal a greeting by companion 600E. In another instance, appendages 640 may be extended outwards from body 601 to show a welcoming stance of companion 600E. In still another instance, an appendage 640 may be extended to provide a hand shake or first bump with a user. Other motions are contemplated. In addition, the appendages may be of any form or configuration, in other embodiments. For instance, the head or upper housing 605 configured as an appendage of the companion 600E may be detachable from the body 601.

Embodiments of the present disclosure support various alternative form factors for the autonomous personal companion, in accordance with embodiments of the present disclosure. Further embodiments provide for communication between two autonomous personal companions 100 either directly, or through a network. As an illustration, each of the companions may be performing operations related to mapping of a room in a building that requires moving around the room, wherein during their movements one or both companion may sense another companion in the proximity. The companions may further move themselves into positons for purposes of communicating with each other. In one implementation, each of the companions may be associated with a corresponding QR code. The QR code codes may be used to exchange identification information. For example, a QR code provides access to information (e.g., via a back-end server) about a corresponding companion. As such, the companions may move themselves to locations where the QR code codes may be passed (e.g., bringing a display showing a QR code of a first companion within viewing range of a camera system of a second companion). Once captured, the QR code then may be delivered to a server over a network to access identification information about the companion associated with the captured QR code. In that manner, identifying information may be exchanged between companions.

Augmentation of Gaming Controller with Projected Content Related to a Gaming Application and/or Game Play of a Gaming Application by a User Controlling the Game Play with the Gaming Controller Accordingly, the various embodiments of the present disclosure describe systems and methods for an autonomous personal companion implemented as AI, wherein the AI makes use of a model (e.g., local AI model) trained via a deep learning engine on information that has been identified as contextually relevant to a user with the goal of providing personalized assistance to the user. In one embodiment, the trained model acts as a behavior selection strategy for the AI as implemented through the personal companion. The local AI model is implemented through an autonomous personal companion that is mobile and configured to move autonomously to position itself to best receive data, collect data, sense the environment, and deliver data. The autonomous personal companion is configurable to provide contextually relevant and personalized assistance to the user. The personal companion was previously introduced in FIGS. 1-6. Personalization of the local AI model is achieved by filtering subjective and/or objective input data used within a deep learning engine 190 to generate the model. If filtering is not performed, then the AI models (local and global) all would be built using the same dataset, and as such would all be the same thus having the same personality (e.g., would achieve the same results for a given input set). In that manner, local AI models are generated with varying personalities, such that each AI model can be unique and reflect or be associated with the personalities of the corresponding user. In addition, embodiments of the present disclosure disclose the augmentation of a gaming controller by projecting content onto the gaming controller by a projection and vision system of an autonomous personal companion. The content may be related to a gaming application and/or game play of a gaming application by a user who is controlling the game play using the gaming controller.

Figure 7A:
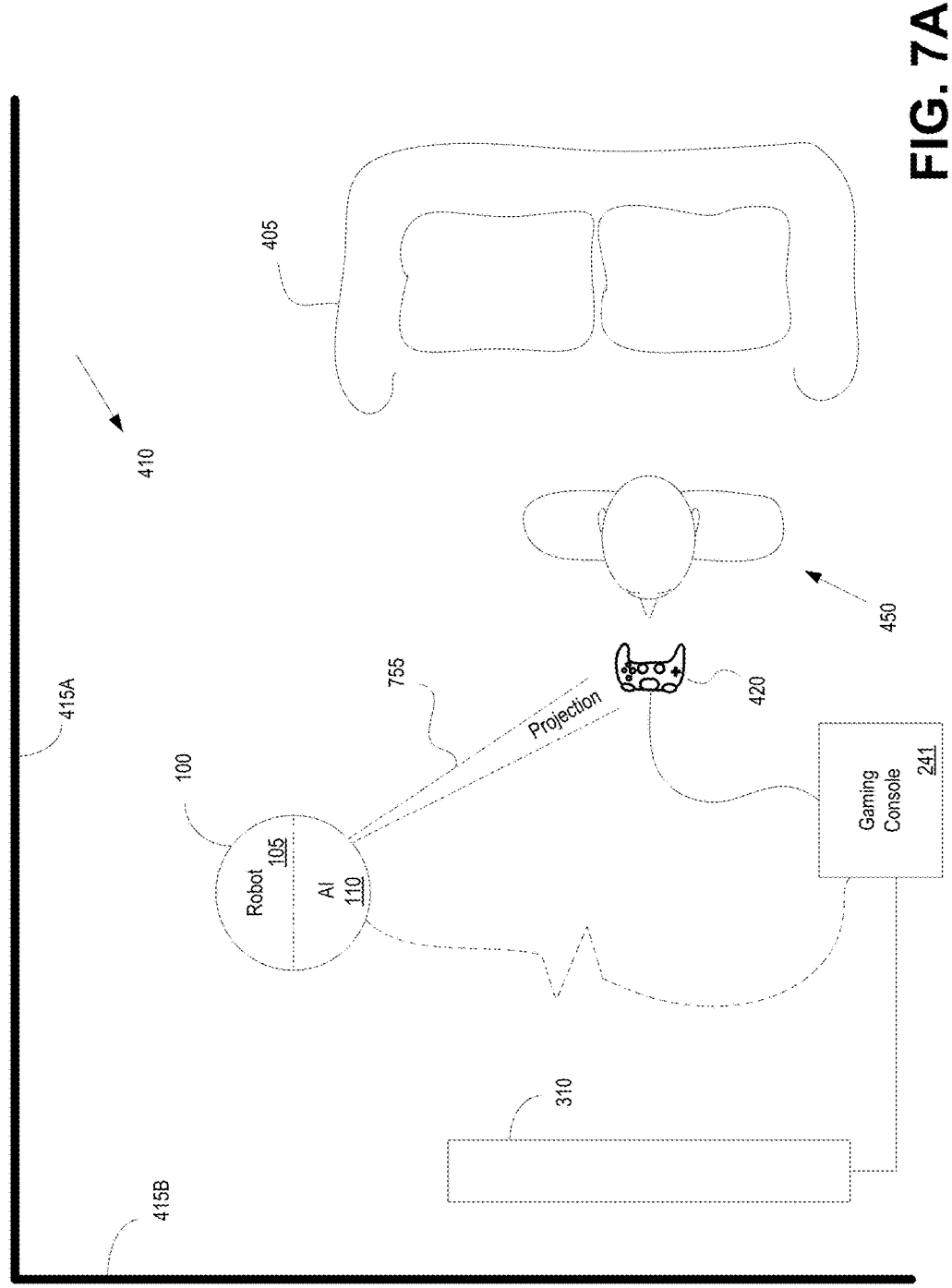
FIG. 7A illustrates a user controlling game play of a gaming application using a gaming controller that is augmented with content, and wherein an autonomous personal companion providing services to the user is configured to project the content related to the gaming application and/or the game play onto the controller, in accordance with one embodiment of the present disclosure.

FIG. 7A illustrates a user controlling game play of a gaming application using a gaming controller that is augmented with content, and wherein an autonomous personal companion 100 providing services to the user is configured to project the content related to the gaming application and/or the game play onto the controller, in accordance with one embodiment of the present disclosure. For example, the autonomous personal companion may be located within a home environment 410 of the user 450, introduced in FIG. 4A. The home environment 410 includes two walls 415A and 415B, and couch 405. The user has access to a gaming console 241. In particular, the gaming application is executing and/or streaming through gaming console 241 (or any other device, such as executing at a back-end server and streamed through the gaming console), in association with game play of the user 450, wherein the game play is responsive to user input, such as through gaming controller 420. A primary stream of the game play is created, wherein video of the game play is delivered to display 310. In addition, audio of the game play may be provided through an audio system (not shown).

As shown, companion 100 may be communicatively coupled to gaming console 241 at least to receive information about the gaming application and/or game play. For example, the information may include the title and version of the gaming application and the game state of the game play. The game state may be used to determine a gaming context of the game play, wherein the context is used to generate content related to the gaming application and/or game play.

As previously described, companion 100 is configured to provide a variety of services to the user 450 under various scenarios, wherein the companion may be configured as a robot form factor 105 with AI 110 that is configured to implement a local AI model 120 of user 450, as previously described. In particular, the personal companion may be configured to provide content that is related to a gaming application and/or game play of a gaming application of a user controlling the game play using a gaming controller. The content may be projected onto the gaming controller 420, as shown by projection stream 755. As shown in FIG. 7A, the companion 100 is located to the right of user 450 and controller 420 within the environment 410. For example, the content may include controller button information that is projected onto a displayable surface of the controller, such as in a region adjacent to the controller button. The controller button information may provide a short summary of the functionality of the controller button.

In other examples, the content may include supplementary information (e.g., hints on how to achieve a goal in the gaming application) supporting the game play of the user. The supplementary information may be projected as projected content onto the gaming controller. For instance, gaming console 241 may generate a primary stream for presentation on display 310 and project the supplementary information onto the controller via the companion 100. For illustration purposes only, the supplementary content may provide general information related to the gaming application, or provide assistance to the user 420 in advancing the game play (e.g., coaching tips on how to achieve a goal—e.g., pass a level, visual cues showing controller inputs that generally or directly help the user achieve the goal, etc.). A detailed description of the supplemental information as provided through a companion application is provided in co-pending patent application entitled "GAME PLAY COMPANION APPLICATION," U.S. patent application Ser. No. 15/476,597, filed on Mar. 31, 2017, herein incorporated by reference in its entirety.

Figure 7B:
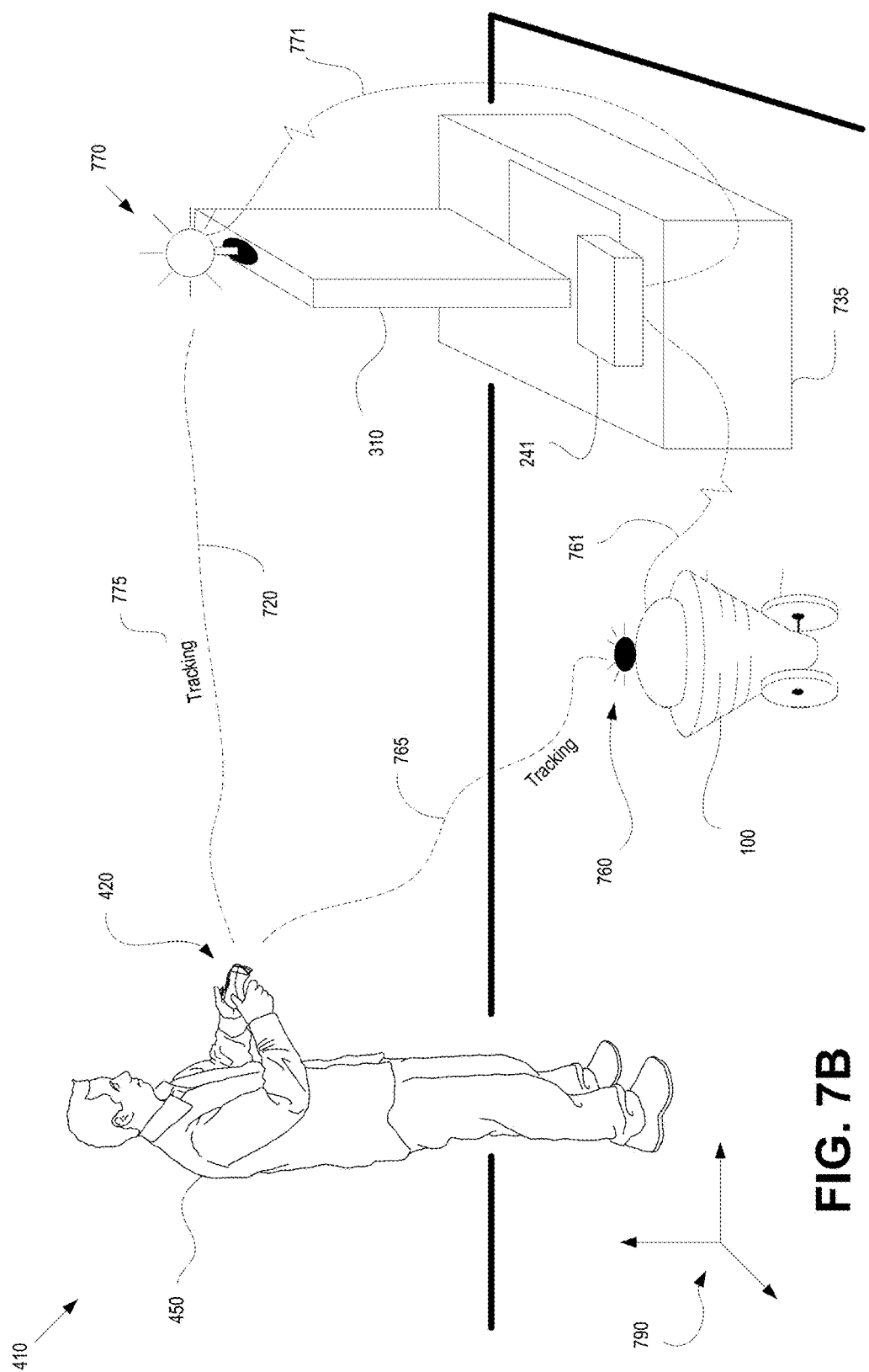
FIG. 7B illustrates a user controlling game play of a gaming application using a gaming controller that is augmented with content, and wherein one or more tracking systems (e.g., a vision system) working cooperatively with an autonomous personal companion are configured to track the gaming controller in order to support the projection of the content by the autonomous personal companion onto the controller, wherein the content is related to the gaming application and/or the game play, in accordance with one embodiment of the present disclosure.

FIG. 7B is a perspective view of the home environment 410 shown in FIG. 7A, wherein user 450 is controlling game play of a gaming application using a gaming controller 420 that is augmented with content, in accordance with one embodiment of the present disclosure. The content may be related to the gaming application and/or game play of the gaming application by a user controlling the game play with a gaming controller. The gaming application is executing and/or streaming through gaming console 241 located on table 735 in association with game play of the user, wherein the game play is responsive to user input, such as through gaming controller 420. A primary stream of the game play is created, wherein video of the game play is delivered to display 310.

In particular, one or more tracking systems (e.g., a vision system) working cooperatively with an autonomous personal companion 100 are configured to track the gaming controller in order to support the projection of the content by the autonomous personal companion onto the controller, wherein the content is related to the gaming application and/or the game play.

As shown, companion 100 includes tracking system 760 that is configured for tracking the gaming controller 420 within a reference system 790. Any suitable reference system may be used, such as a 3D coordinate system, that can be used to provide positioning and orientation information of objects located within the reference system. For example, tracking system 760 may be configured as a vision system that is able to capture visual data and determine location and orientation information of objects within a reference system defined within an environment captured by the visual data (e.g., image, video, etc.). Other systems for performing tracking may include systems implementing infrared, ultrasonic, audio, emission systems, light tracking, motion based tracking, inertial systems, etc. Tracking signals 765 may be generated and/or received by tracking system 760 for purposes of tracking position and orientation of controller 420 within the environment 410. For illustration, tracking system 760 may implement an infrared antenna and/or sensor system capable of tracking the gaming controller 420 within the environment 410. In another illustration, controller 420 may include inertial sensors that may provide information related to position and orientation of the gaming controller 420 that is delivered to the companion 100 either directly or via the gaming console 241. For instance, companion 100 is in communication with the gaming console 241, such as via wired or wireless communication link 761 to receive the inertial sensing, position and/or orientation, gaming application, context of game play, etc. information from the gaming console.

Further, tracking system 770 may be configured for tracking the gaming controller 420 within a reference system 790. Tracking signals 775 may be generated and/or received by tracking system 770 for purposes of tracking position and orientation of controller 420 within the environment 410. For example, tracking system 770 may implement any suitable tracking methodology, such as vision, infrared, ultrasonic, audio, emission systems, light tracking, motion based tracking, inertial systems, etc. in order to track the position and orientation of the gaming controller 420 within the reference system 790. Tracking system 770 may be in communication with the gaming console 241, such as via wired or wireless communication link 771 to pass the sensing, position and/or orientation information to the gaming console. In addition, tracking system 770 may be in communication with the companion 100 either directly or indirectly (e.g., via the gaming console 241) to pass the sensing, position and/or orientation information.

In addition, the tracking information may be utilized by the gaming controller position tracking module 710 and the gaming controller orientation tracker 720 within the personal companion 100 in order to determine position and orientation information related to the gaming controller 420. For example, the position tracking module 710 is able to analyze the information to determine the current position of the controller 420 on a continual basis within the reference system 790. Furthermore, the orientation tracker 720 is able to analyze the information to determine the orientation of the controller at a current position within the reference system 790. The position tracking module 710 and the orientation tracker 720 may utilize tracking information from one or more tracking systems, such as systems 760 and 770.

FIG. 7C is another perspective view of the home environment 410 shown in FIGS. 7A-7B, wherein a user 450 (not shown) is controlling game play of a gaming application using a gaming controller 420 that is augmented with content, in accordance with one embodiment of the present disclosure. In particular, the gaming controller 420 is augmented by the projection of content onto one or more displayable surfaces of the gaming controller. The projection is performed by the autonomous personal companion 100 configured for providing services to the user, wherein the content may be related to a gaming application and/or a game play of the gaming application, in accordance with one embodiment of the present disclosure.

The orientation 795 of gaming controller 420 is shown in FIG. 7C, wherein the orientation is presented with reference to the reference system 790, previously introduced. Specifically, the orientation 795 of the gaming controller is shown for a given location of the controller within the reference system 790. For illustration purposes only, FIG. 7C shows the orientation of the controller as being tilted slightly downward to the right from a neutral position (e.g., as if the controller were placed normally on a horizontal surface of table 735—with the face of the controller facing up in the z-direction of the reference system 790).

Figure 8A:
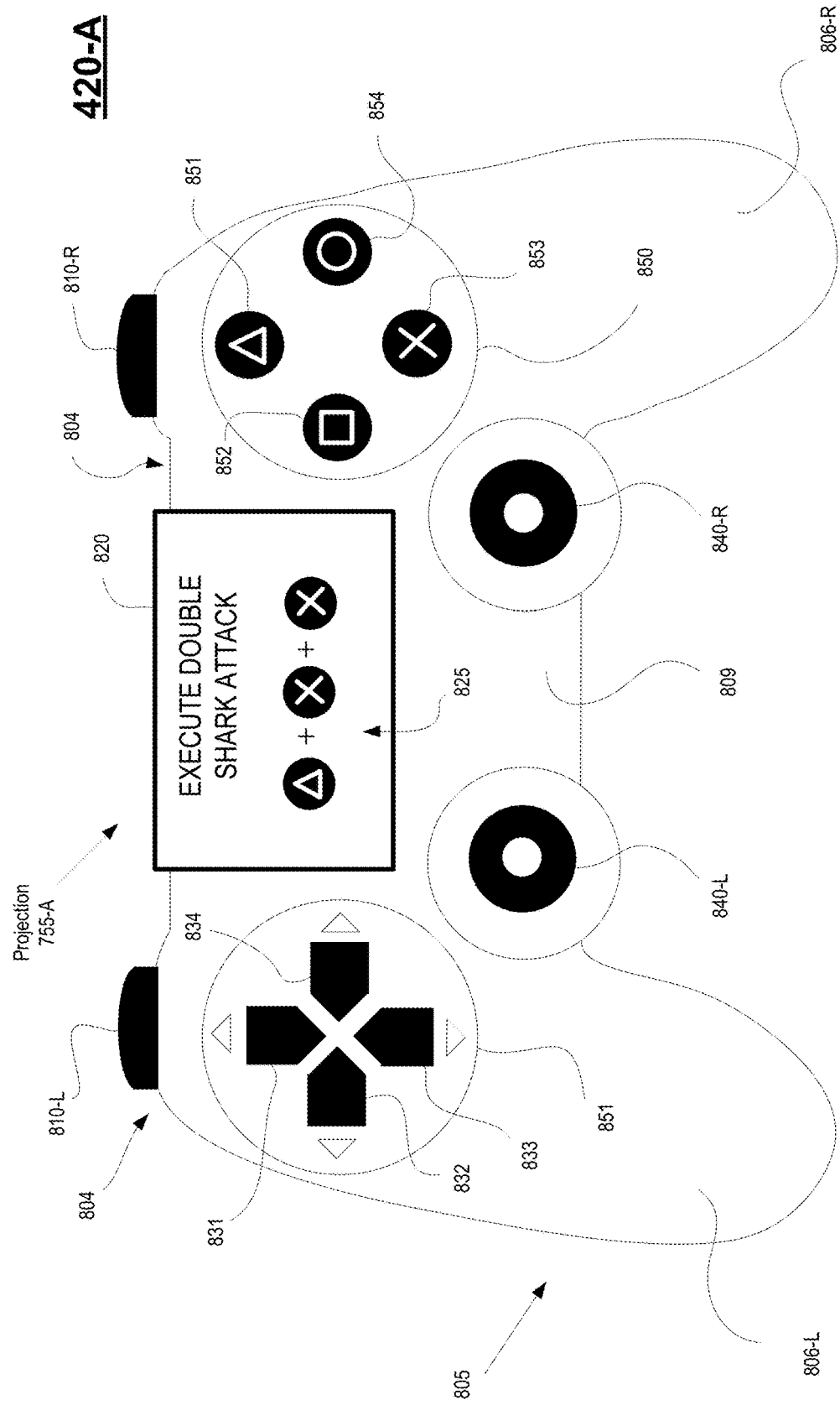
FIG. 8A illustrates the augmentation of a gaming controller with projected content including a displayable surface that is configured for and dedicated to receiving content that may be related to a gaming application and/or a game play of the gaming application, in accordance with one embodiment of the present disclosure.
Figure 8B:
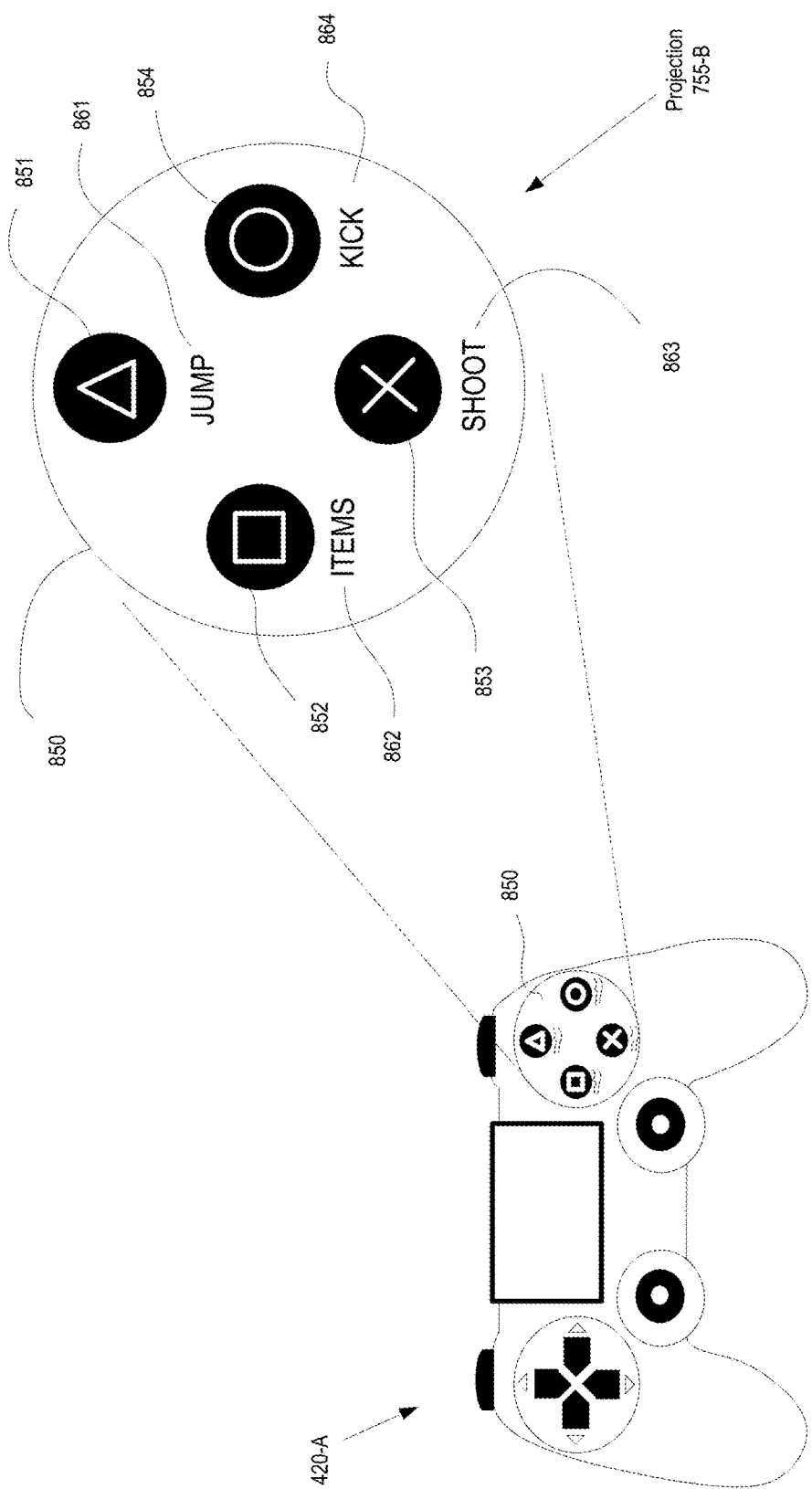
FIG. 8B illustrates the augmentation of a gaming controller with content that is projected onto the controller in regions adjacent to controller buttons and/or actuators, wherein the content is displayed to support use of the buttons and/or actuators, and wherein the content may be related to a gaming application or game play of the gaming application by a user, in accordance with one embodiment of the disclosure.

Given the location and the orientation information within the reference system as well as orientation and location information of the personal companion 100, the personal companion is able to project content to one or more displayable surfaces of the gaming controller 420. The orientation and location information of the personal companion 100 may be determined using an internal tracking system of the companion (e.g., tracking system 760 that may include an inertial tracking system, etc.), or using an external tracking system (e.g., tracking system 770). As shown, the projection system 750 of the personal companion 100 is configured to project first content onto displayable surface 820 of the gaming controller 420, along projection 755-A. For example, FIG. 8A illustrates the projection of exemplary content onto displayable surface 820. In addition, the projection system 750 is configured to project second content onto displayable surfaces contained within or adjacent to the right-hand control pad 850 along projection 755-B. For example, FIG. 8B illustrates the projection of exemplary content onto displayable surfaces within or adjacent to right-hand control pad 850.

The projection system 750 is configured to project images and/or video in a light or visually based system, in one embodiment. Other embodiments are well suited to projection of content using other types of systems, including infrared, laser, etc. in a manner that the user is able to receive and recognize the projected content. In still other embodiments, the projected content is delivered over a wireless or wired connection between the projection system 750 of the companion 100 and the controller 420, wherein the controller is configured with a display (e.g., digital display) capable of presenting the content.

FIG. 8A illustrates the augmentation of a gaming controller 420-A with projected content including a displayable surface 820 that is configured for and dedicated to receiving content that may be related to a gaming application and/or a game play of the gaming application, in accordance with one embodiment of the present disclosure. For example, the content may be delivered over projection 755-A from the projection system 750 of personal companion 100 as shown in FIG. 7C.

An exemplary configuration of gaming controller 420-A is shown in FIG. 8A. controller 420-A is configured for two handed manipulation, wherein the body 805 of controller 420-A includes a left arm 806-L and a right arm 806-R. When the controller 420-A is handled by a user, the palm of the left hand of the user rests against the left arm 806-L, and the palm of the right rests against the right arm 806-R. In addition, controller 420-A may include a left index finger trigger button 810-L, and a right index finger trigger button 810-R. The index finger trigger buttons 810-L and 810-R are located at the front edge 804 of the body 805 such that the index fingers easily can reach or are resting on the index finger trigger buttons. Also, controller 420-A includes a left analog stick 840-L and a right analog stick 840-R, wherein the analog sticks protrude from a top surface of the controller 420-A. Normally, the left analog stick 840-L is manipulated by the thumb on the left hand of the user, and the right analog stick 840-R is manipulated by the thumb on the right hand of the user.

Gaming controller 420-A includes a left control pad 851 including one or more trigger buttons that may be manipulated by the thumb of the left hand of the user. Control pad 851 is located to the left side of the top surface of the controller, such that the thumb can reach out and manipulate the directional trigger buttons. In particular, control pad 851 may include a top directional trigger button 831, wherein actuation of the button may give a forward movement command (e.g., move an object forward within an gaming environment). Control pad 851 may include a left directional trigger button 832, wherein actuation may give a left movement command (e.g., move object to the left within the gaming environment). Control pad 851 may include a bottom directional trigger button 833, wherein actuation may give a backwards movement command (e.g., move object backwards within the gaming environment). Also, control pad 851 may include a right directional trigger button 834, wherein actuation may give a right movement command (e.g., move object to the right within the gaming environment).

Gaming controller 420-A includes a right control pad 850 including one or more face/trigger buttons that may be manipulated by the thumb of the right hand of the user. Control pad 850 is located to the right side of the top surface of the controller, such that the thumb can reach out and manipulate the face/trigger buttons. In particular, control pad 850 may include a trigger button 851 marked with a triangle, a trigger button 852 marked with a square, a trigger button 853 marked with an "X", and a trigger button 854 marked with a circle. Various functionalities may be given to these trigger buttons. For example, for a typical gaming application, these trigger buttons may each have a fixed functionality that more or less follows conventional gaming developer usage.

Gaming controller 420-A includes a displayable surface 820. For purposes of illustration, surface 820 is located in the center of top surface 809, and located more towards the front edge 804 of the controller. For example, displayable surface 820 is located in a region that is large enough to show content 825, without interference from any control buttons or analog sticks. As shown, displayable surface may be suitable for receiving projected content, such as content projected from the projection system 750 of the personal companion 100. That is, displayable surface 820 may be coated or made with a surface suitable for receiving and presenting the content for viewing by a user.

As shown, the content 825 may include supplemental information that is useful in advancing the game play of the user playing a corresponding gaming application. The supplemental information may provide instructions on how to execute a double shark attack by a character controlled by the user in the game play. The double shark attack may include a manipulation sequence of trigger buttons, such that the triangle trigger button 851 is actuated first, then the "X" trigger button 853 is executed twice thereafter. As such, the companion 100 may determine that the user is having difficulty in executing the double shark attack, which is needed to complete a mission (e.g., beat the boss using the double shark attack), and as such projects the content including instructions on how to execute the double shark attack onto the gaming controller 420-A. The projection may be performed with or without a request by the user. In addition, the projection is performed simultaneous with the game play, such that the game play need not be paused in order for the user to navigate to a separate instruction screen providing the sequence of trigger button moves needed to perform a double shark attack.

FIG. 8B illustrates the augmentation of a gaming controller with content that is projected onto the controller in regions adjacent to controller buttons and/or actuators, wherein the content is displayed to support use of the buttons and/or actuators, and wherein the content may be related to a gaming application or game play of the gaming application by a user, in accordance with one embodiment of the disclosure. For example, the content may be delivered over projection 755-B from the projection system 750 of personal companion 100 as shown in FIG. 7C.

The exemplary gaming controller 420-A was previously introduced in FIG. 8A, and is configured for two handed manipulation, and includes in part a right control pad 850 having face/trigger buttons manipulated by the thumb of the right hand of the user. For example, the right control pad 850 includes triangle trigger button 851, square trigger button 852, "X" trigger button 853, and circle trigger button 854. For example, for a typical gaming application, these trigger buttons may each have a first functionality for a gaming application.

FIG. 8B shows an enlarged view of right control pad 850, and more specifically illustrates content that is projected onto the displayable surfaces of the control pad 850. The control pad may have surface regions that are suitable for receiving projected content, such as content projected from the projection system 750 of the personal companion 100. That the surface of the control pad 850 may be coated or made with a surface suitable for receiving and presenting the content for viewing by a user. For illustration, the projection system 750 may project content 861 (e.g., "JUMP" instruction) that is located adjacent to the triangle trigger button 851. As such, the "JUMP" content 861 may provide information to the user about the current functionality of the triangle trigger button 851. In addition, the projection system 750 may project content 862 (e.g., "ITEMS" instruction) that is located adjacent to the square trigger button 852. As such, the "ITEMS" content 862 may provide information to the user about the current functionality of the square trigger button 852. Also, the projection system 750 may project content 863 (e.g., "SHOOT" instruction) that is located adjacent to the "X" trigger button 853. As such, the "SHOOT" content 863 may provide information to the user about the current functionality of the "X" trigger button 853. Further, the projection system 750 may project content 864

(e.g., "KICK" instruction) that is located adjacent to the circle trigger button 854. As such, the "KICK" content 864 may provide information to the user about the current functionality of the circle trigger button 854.

The contents 861-864 projected onto control pad 850 may provide first functionality of one or more respective trigger buttons. That is, the first functionality may be the designed functionalities of the gaming controller for a particular gaming application. In addition, the content 861-864 projected onto control pad 850 may at other times provide second functionality of one or more respective trigger buttons. That is, a trigger button may change its functionality at a particular point in the game play of the gaming application. In all of these situations, the content providing instructions about the functionality of a corresponding trigger button may be projected to the control pad simultaneous with the game play of the user. That is, the user need not pause the game play in order to navigate to an instruction screen providing functionalities of the various control buttons at a particular point it the game play. Instead, the personal companion projects the existing or new functionality onto the gaming controller as projected content (e.g., content 861 providing functionality instructions projected adjacent to a corresponding trigger button 851).

Figure 9A:
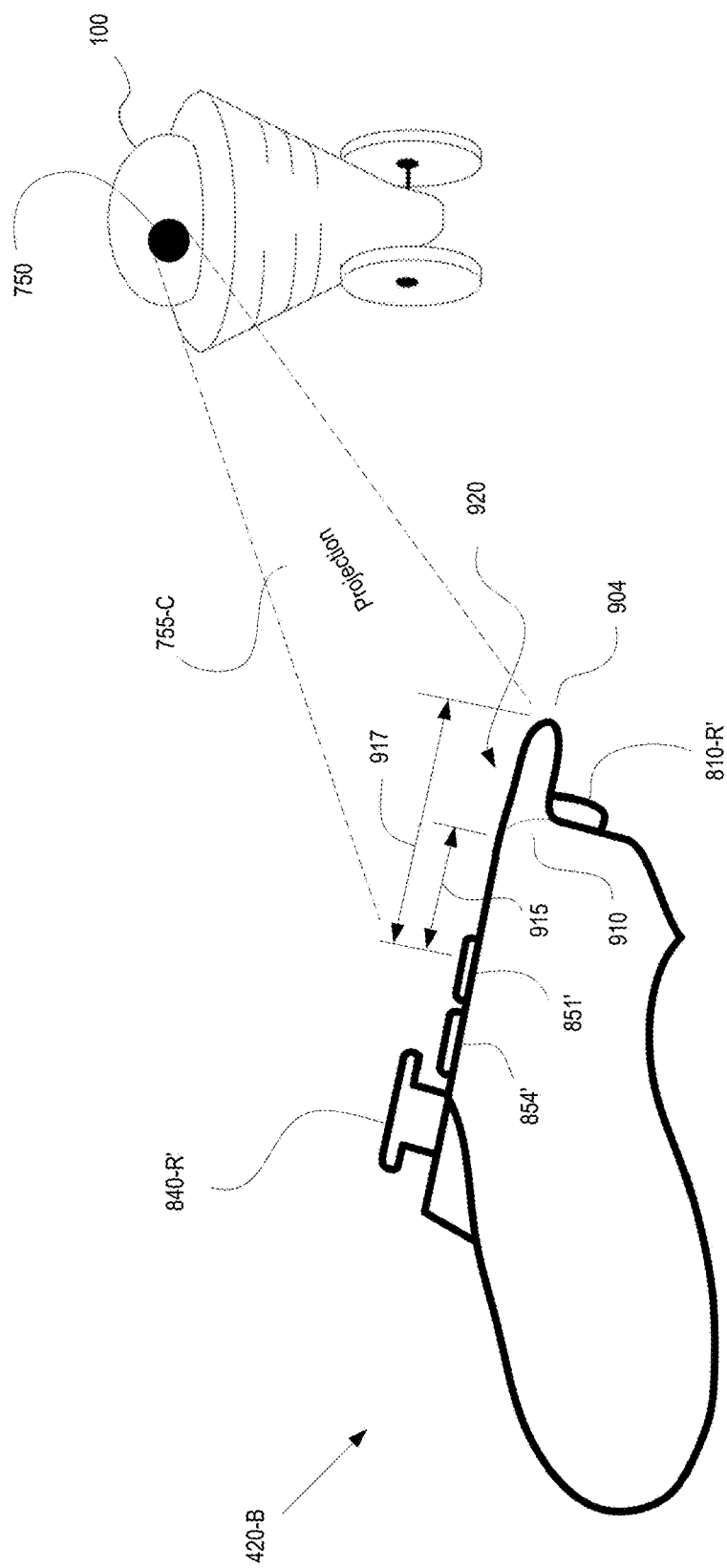
FIG. 9A illustrates a gaming controller that includes an displayable surface that is enlarged to facilitate the projection of content that may be related to a gaming application or game play of the gaming application by a user, in accordance with one embodiment of the disclosure.

FIG. 9A illustrates a gaming controller 420-B that includes an displayable surface 920 that is enlarged to facilitate the projection of content that may be related to a gaming application or game play of the gaming application by a user, in accordance with one embodiment of the disclosure. The gaming controller 420-B is similar to controller 420-A introduced in FIG. 8A, except the top surface may be extended further such that the front edge 904 of the controller 420-B is located further from the left analog stick 840-L' (not shown) and right analog stick 840-R' than the location of the front edge 804 of controller 420-A from each of the right analog stick 840-R and/or left analog stick 840-L. As such, gaming controller 420-B is configured for two handed manipulation and includes left index finger trigger button (not shown), right index finger trigger button 810-R', left analog stick (not shown), right analog stick 840-R', trigger buttons in a left control pad (not shown), and trigger button on a right control pad (e.g., trigger buttons 854' and 851').

Displayable surface 920 of gaming controller 420-B is much larger than, for example, surface 820 of gaming controller 420-A. For example, the approximate length between the top and bottom edges of surface 820 is shown by dimension 915, which is smaller than the approximate length between the top and bottom edges of surface 920. As such, when compared to surface 820, displayable surface 920 can accommodate the projection of more content. For instance, content may be projected along projection 755-C from projection system 750 of personal companion 100.

Figure 9B:
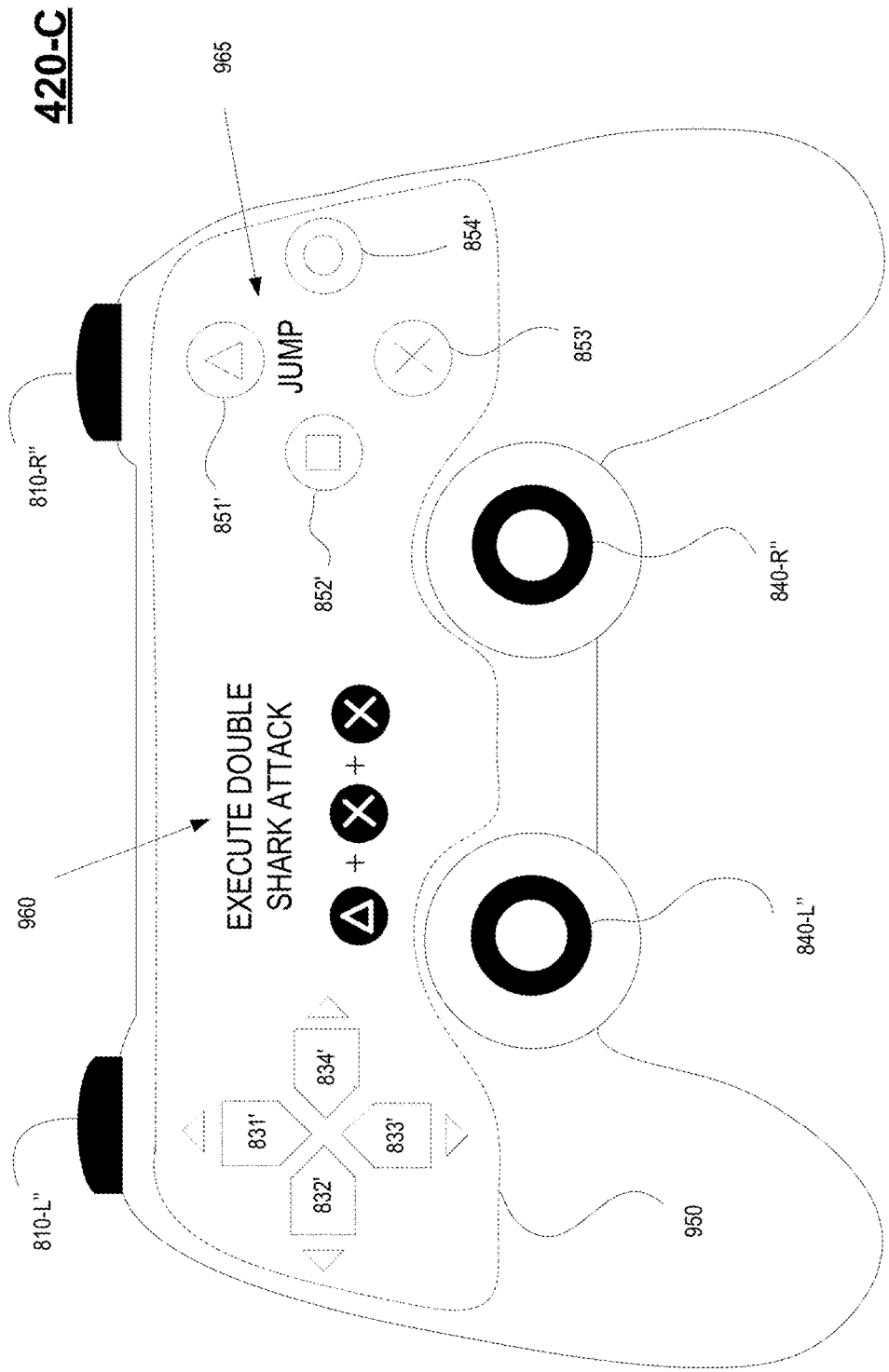
FIG. 9B illustrates a gaming controller that includes an integrated digital display that is configured to display content that may be related to a gaming application or game play of the gaming application by a user, in accordance with one embodiment of the disclosure.

FIG. 9B illustrates a gaming controller 420-C that includes an integrated digital display 950 that is configured to display content that may be related to a gaming application or game play of the gaming application by a user, in accordance with one embodiment of the disclosure.

Gaming controller 420-B is configured for two handed manipulation and may include display 950 that may be configured for interaction (e.g., touch screen). Typical control buttons may be configured on gaming controller, such as left index finger trigger button 810-L", right index finger trigger button 810-R", left analog stick 840-L", and right analog stick 840-R". The trigger buttons on a left control pad may be digitally implemented, and include directional trigger buttons 831', 832', 833', and 834'. Also, the trigger buttons on a right control pad may be digitally implemented, and include a triangle trigger button 851', a square trigger button 852', an "X" trigger button 853', and a circle trigger button 854'.

Further, the digital display 950 may be configured to present content, as previously introduced (e.g., controller button functionality, supplemental content, etc.). For example, content 960 may be displayed to provide the trigger button sequence necessary to execute the double shark attack (previously introduced in FIG. 8A), and content 965 may be displayed to provide the functionality (e.g., "JUMP") of the digitized triangle trigger button 851'.

Figure 10:
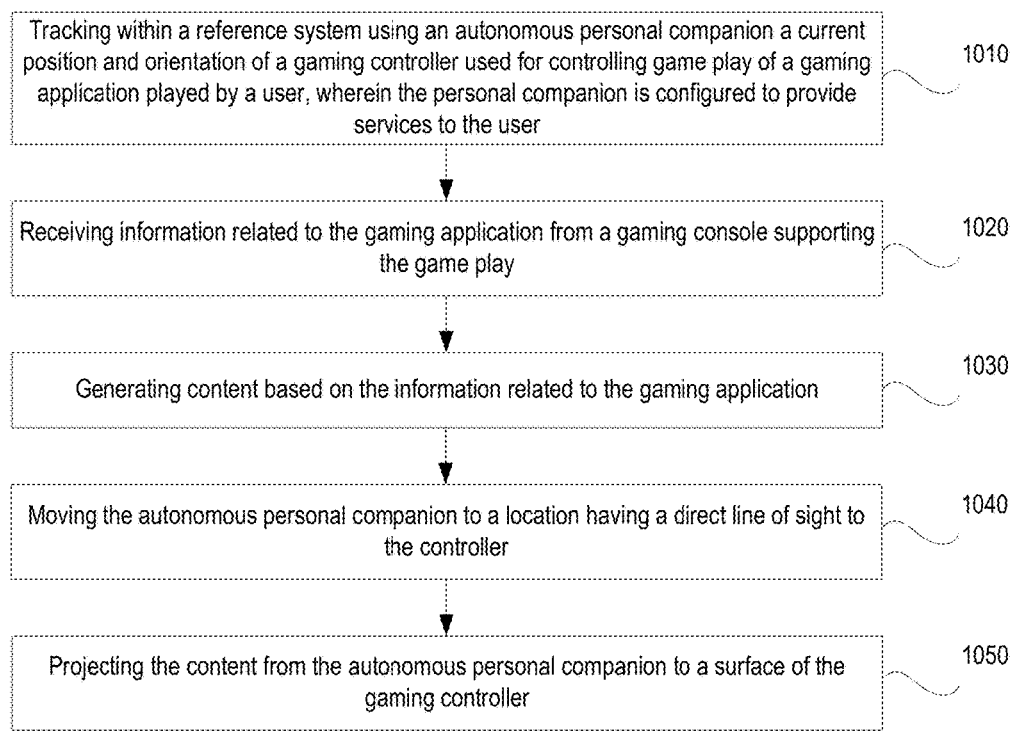
FIG. 10 is a flow diagram illustrating a method for augmenting a gaming controller by projecting content onto a displayable surface of the controller, wherein the content may be related to a gaming application or game play of the gaming application by a user, in accordance with one embodiment of the present disclosure.

With the detailed description of the various modules of the projection and vision systems of an autonomous personal companion, flow diagram 1000 of FIG. 10 discloses a method for augmenting a gaming controller by projecting content onto a displayable surface of the gaming controller, wherein the content may be related to a gaming application and/or a game play of a gaming application that is controlled by inputs of a gaming controller, in accordance with one embodiment of the present disclosure. Flow diagram 1000 may be implemented within a companion 100, in embodiments.

At 1010, the method includes tracking within a reference system by an autonomous personal companion a current position and orientation of a gaming controller used for controlling game play of a gaming application played by a user, wherein the personal companion is configured to provide services to the user. For example, the operation at 1010 may be performed by the gaming controller position tracking module 710 and/or the gaming controller orientation tracker 720. In addition, one or more tracking systems may be employed for purposes of tracking. In one embodiment, the autonomous personal companion is configured for tracking. In another embodiment, a second tracking system working cooperatively with the gaming console or another device is implemented to augment the tracking or independently track the current position and orientation of the gaming controller.

The reference system is established within a physical environment. The autonomous personal companion is able to track itself with respect to the reference system, and to track its orientation within the reference system. The autonomous personal companion is also able to track the location and orientation of a gaming controller within the physical environment. For example, tracking systems (e.g., vision, infrared, ultrasonic, etc.) may be employed for tracking one or more objects within the physical environment, as previously described. Further, because the personal companion is able to track or receive tracking information pertaining to itself and the gaming controller, the companion is able to determine relative positioning between the personal companion and the gaming controller. That is, the relative distance between the objects is known, and their relative orientations are also known. In that manner, the personal companion is able to determine the correct angle and direction to project content in order for that content to reach a specific target area on the surface of the gaming controller.

In one embodiment, the reference system is fixed to a location within the physical environment. That is, the personal companion and the gaming controller objects may move within the reference system. In another embodiment, the reference system is fixed to an object, such as the personal companion. That is, as the personal companion moves and changes its orientation, the reference system will also change with the movements and orientation rotations. In either case, relative positioning and orientation between the autonomous personal companion and the gaming controller are known to or determined by the companion.

At 1020, the method includes receiving information related to the gaming application from a gaming console supporting the game play. In particular, the autonomous personal companion determines the context within which to provide information to the user. In some cases, the information received may be general information related to a gaming application and/or the game play of a user playing the gaming application as directed by commands issuing from a gaming controller. For purposes of illustration, that information may include game title, difficulty of the game, first functionality of the controls (e.g., trigger buttons, analog sticks, etc.) of the gaming controller, point within the gaming application corresponding to game play, current functionality of the controls corresponding to the point within the gaming application associated with the game play, etc. Also for purposes of illustration, that inform may include additional and more detailed information, such as current context of the game play of the user playing the gaming application to include game state information, etc. This information is useful in determining what content would be of interest to the user.

At 1030, the method includes generating content based on the information related to the gaming application. The content is related to the gaming application and/or the game play of a user playing the gaming application, wherein the user controls the game play using at least a gaming controller. In particular, the content may include supplemental content that is helpful to the user when playing the gaming application. For example, a current context of the in the game play may be determined based on the information, previously received. The content that is generated may include contextually relevant information based on the current context. For instance, the content may provide helpful information that may be used to advance the game play of the user. For example, the content including information may include tips and hints to overcome a current task or goal in the game play of the user. As an illustration, the user may be attempting to beat a boss at the end of a level, but is unable to because the user is unaware of a specific trick needed to attack a weakness of the boss. The content generated may include instructions on how to execute that specific trick.

The content may be directed towards other types of information. For example, the content may be of general interest to the user related to the gaming application. The information may be socially oriented, such that information about the popularity of the gaming application may be generated as content, or information related to the game play of friends of the user may be generated (e.g., scores of one or more friends which can be used for comparison to the current score of the user), etc. In other implementations, the content may be advertisement oriented. The advertisement may be related to the gaming application, or targeted to users playing the specific gaming application.

In still other embodiments, the content may be related to the functionality of physical controls on the gaming controller. For example, the controls may include analog sticks, trigger buttons, face buttons, etc. Each of the controls may have an associated current functionality at a certain point in the gaming application. For a specific control, the game developer may have a fixed or specified functionality for a corresponding point in the game. In other embodiments, a modified control may be imposed on top of the fixed or specified functionality, such that the modified control augments or supersedes the fixed or specified functionality. In all of these cases, the content may be related to the functionality that corresponds to a particular control, such that for each control there is corresponding content related to the corresponding functionality of that control. For example, based on the information collected previously, an actuator or control (e.g., trigger button, directional trigger button, analog stick, etc.) may be isolated or determined. The actuator or control provides a specific command (e.g., functionality) for a current point in the game play of the user, wherein the current point is determined by the context of the game play. That is, when the actuator or control is actuated, the command is executed by the gaming application to influence or control the game play. As such, the content may provide information related to the command or functionality of the control.

At 1040, the method includes moving the autonomous personal companion to a location having a direct line of sight to the controller. As previously described for illustrations purposes only, movement may include positioning the personal companion closer to the user in order to be in a better position for collecting data, or to be in a better position for communicating with the user; following the user, such that as the user moves throughout a room or a house or building, the personal companion also moves with the user; positioning the personal companion in a location that facilitates projection of images onto a displayable surface of the controller, etc.

At 1050, the method includes projecting the content from the autonomous personal companion to a surface of the gaming controller. In particular, the companion is configured to track the current location and orientation of the gaming controller within the reference system. Tracking may be performed by a tracking system using any technique, such as a vision, infrared, ultrasonic, etc. In particular, the personal companion is able to track, or receive information including tracking information, to determine the position and orientation of a displayable surface of the controller within the reference system. In addition, the relative position and orientation of the displayable surface with respect to the position and orientation of the personal companion (e.g., the projection system) may also be determined, since the positions and orientations of both the gaming controller and the personal companion are tracked within the reference system.

Further, the personal companion is able to align the content to the orientation of the displayable surface of the controller when projecting the content to the surface. That is, the content is projected in such a manner that it is aligned properly to the orientation of the controller. As such, when the user is handling the controller in the typical and intended fashion, the projected content is readable and/or interpretable to the user. That is, the projected content is properly aligned to the face and/or gaze of the user.

For example, the content may include functionality (command executed by the actuator when actuated) of an actuator or control (e.g., trigger button, analog stick, etc.) of the gaming controller. The position of the actuator on the surface of the gaming controller is known because the orientation and position of the gaming controller within the reference system is tracked. The content is aligned to the actuator or control, such that when projected the content is displayed adjacent to the actuator. The content is a visual representation of the command (e.g., "JUMP"). That is, the content may be text or an icon. As such, the projected content is displayed in a position that is associated with the actuator or control (e.g., adjacent to and below the actuator).

In other embodiments, the alignment is made with respect to the face and/or gaze of the user without consideration of the proper orientation (e.g., front and top) of the gaming controller. That is, the user may be mishandling the controller (e.g., upside down), but the content is still projected and aligned to the face and/or gaze of the user, such that the user is able to read an interpret the content.

In some embodiments, the content is not projected using a projection system (e.g., light based), but is delivered from the personal companion to the gaming controller, wherein the gaming controller includes a digital display. As such, the projection of information includes wired and/or wireless delivery of the content to the gaming controller. For example, the content may include a visual actuator or control (e.g., virtual trigger button, stick, etc.) that when interacted with provides a command to the gaming application for execution, wherein the command performs or is associated with a functionality. The visual actuator is projected by sending instructions for displaying the actuator as the content on the surface. Additional information related to the visual actuator may also be generated and displayed. For example, the functionality of the visual actuator may be displayed relative to the visual actuator (e.g., adjacent). The method may determine that the visual actuator is actuated, or interacted with by the user, and a command is then delivered to the gaming application for execution in the game play.

In other embodiment, the content includes a projected actuator that is projected onto a surface of the gaming controller. The projected actuator that when actuated provides a command to the gaming application for execution, wherein the command performs or is associated with a functionality. A vision system or a tracking system may be used to determine when the projected actuator is actuated (e.g., when a thumb or finger passes through the projected actuator, etc.). In that manner, instructions for executing the command may be delivered to the gaming console. For instance, the personal companion may be projecting the projected actuator, and tracking to determine when the projected actuator is interacted with or actuated. Once actuated, the personal companion delivers the instruction to the gaming console to execute the command.

In another embodiment, the autonomous personal companion is a participating companion to the user in an augmented reality (AR) or mixed reality (MR) gaming application, wherein virtual objects may appear in a scene of the AR/MR space and may include real objects from the corresponding physical space, such as the user and the personal companion. Specifically, the autonomous personal companion connect to the same AR/MR gaming application being played by the user, and may play in a cooperative, adversarial, or indifferent manner Objects in the physical environment and included in the AR/MR space may be used to enhance the game play. The personal companion may be a teammate or an opponent of the user within the AR/MR gaming application, or may act independently of the user. For example, as teammates, both the personal companion and user are able to see the game play (see through a corresponding display and/or understand through a digital feed), and react accordingly. In that manner, both the user and personal companion personal may physically hide behind a couch in the living room to avoid being seen by virtual opponents in the AR/MR space. As another example, as opponents, both the personal companion and user may see into the AR/MR space, and hide from each other in the physical space (e.g., user hides behind couch, and/or personal companion hides behind a wall). As such, the personal companion is able to "see" what the user sees in the AR/MR game play, and try to achieve the same or different goals as the user. In still another embodiment, the personal companion may be mimicking the actions of remote user (e.g., friend of the user) who is playing the same AR/MR gaming application with the user. That is, the remote user is controlling the actions of the personal companion within the AR/MR space.

Accordingly, in various embodiments the present disclosure describes systems and methods configured for augmenting a gaming controller by projecting content onto a displayable surface of the controller, wherein the content is related to a gaming application and/or game play of a gaming application being played by a user that directs the game play through a gaming controller.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method of projection, comprising:
   tracking within a reference system by an autonomous personal companion a current position and orientation of a gaming controller used for controlling game play of a gaming application played by a user, wherein the autonomous personal companion is configured to provide services to the user;
   receiving information related to the gaming application from a gaming console supporting the game play;
   generating content based on the information related to the gaming application;
   moving the autonomous personal companion to a location having a direct line of sight to the current position and orientation of the gaming controller; and
   projecting the content from the autonomous personal companion to a surface of the gaming controller.

2. The method of claim 1, further comprising:
   tracking an orientation of the gaming controller using a vision system of the autonomous personal companion, wherein the vision system is configured to track the current position of the gaming controller;
   determining a position and orientation of a displayable surface of the gaming controller; and
   aligning the content to the orientation of the displayable surface of the gaming controller when projecting the content to the surface.

3. The method of claim 1, wherein tracking a current position comprises:
   augmenting the tracking of the current position of the gaming controller by a second tracking system of the gaming console.

4. The method of claim 1, further comprising:
   determining a current context in the gaming application associated with the game play;
   based on the information, determining an actuator in the gaming controller that when actuated provides a command to the gaming application at a point; and
   displaying the content adjacent to the actuator, wherein the content is a visual representation of the command.

5. The method of claim 4, wherein the content comprises text or an icon.

6. The method of claim 4, wherein the actuator comprises an analog stick or trigger button.

7. The method of claim 1, further comprising:
   generating the content comprising a visual actuator that when interacted with provides a command to the gaming application; and
   projecting the visual actuator as the content onto the surface;
   determining when the user actuates the visual actuator; and
   sending the command to the gaming application for execution in the game play.

8. The method of claim 1, wherein the generating content further comprises:
   determining a current context in the game play based on the information; and
   generating contextually relevant information as the content based on the current context.

9. A computer system comprising:
   a processor; and
   memory coupled to the processor and having stored therein instructions that, if executed by the computer system, cause the computer system to execute a method comprising:
   tracking within a reference system by an autonomous personal companion a current position and orientation of a gaming controller used for controlling game play of a gaming application played by a user, wherein the autonomous personal companion is configured to provide services to the user;
   receiving information related to the gaming application from a gaming console supporting the game play;
   generating content based on the information related to the gaming application;
   moving the autonomous personal companion to a location having a direct line of sight to the current position and orientation of the gaming controller; and
   projecting the content from the autonomous personal companion to a surface of the gaming controller.

10. The computer system of claim 9, wherein the method further comprises:
    tracking an orientation of the gaming controller using a vision system of the autonomous personal companion, wherein the vision system is configured to track the current position of the gaming controller;
    determining a position and orientation of a displayable surface of the gaming controller; and
    aligning the content to the orientation of the displayable surface of the gaming controller when projecting the content to the surface.

11. The computer system of claim 9, wherein the method further comprises:
    determining a current context in the gaming application associated with the game play;
    based on the information, determining an actuator in the gaming controller that when actuated provides a command to the gaming application at a point; and
    displaying the content adjacent to the actuator, wherein the content is a visual representation of the command.

12. The computer system of claim 11, wherein in the method the content comprises text or an icon.

13. The computer system of claim 9, wherein the method further comprises:
    generating the content comprising a visual actuator that when interacted with provides a command to the gaming application; and
    projecting the visual actuator as the content onto the surface;
    determining when the user actuates the visual actuator; and
    sending the command to the gaming application for execution in the game play.

14. The computer system of claim 9, wherein in the method the generating content further comprises:
    determining a current context in the game play based on the information; and
    generating contextually relevant information as the content based on the current context.

15. A non-transitory computer-readable medium storing a computer program for implementing a method, the computer-readable medium comprising:
- program instructions for tracking within a reference system by an autonomous personal companion a current position and orientation of a gaming controller used for controlling game play of a gaming application played by a user, wherein the autonomous personal companion is configured to provide services to the user;
- program instructions for receiving information related to the gaming application from a gaming console supporting the game play;
- program instructions for generating content based on the information related to the gaming application;
- program instructions for moving the autonomous personal companion to a location having a direct line of sight to the current position and orientation of the gaming controller; and
- program instructions for projecting the content from the autonomous personal companion to a surface of the gaming controller.

16. The non-transitory computer-readable medium of claim 15, further comprising:
- program instructions for tracking an orientation of the gaming controller using a vision system of the autonomous personal companion, wherein the vision system is configured to track the current position of the gaming controller;
- program instructions for determining a position and orientation of a displayable surface of the gaming controller; and
- program instructions for aligning the content to the orientation of the displayable surface of the gaming controller when projecting the content to the surface.

17. The non-transitory computer-readable medium of claim 15, further comprising:
- program instructions for determining a current context in the gaming application associated with the game play;
- based on the information, program instructions for determining an actuator in the gaming controller that when actuated provides a command to the gaming application at a point; and
- program instructions for displaying the content adjacent to the actuator, wherein the content is a visual representation of the command.

18. The non-transitory computer-readable medium of claim 17, wherein the content comprises text or an icon.

19. The non-transitory computer-readable medium of claim 15, further comprising:
- program instructions for generating the content comprising a visual actuator that when interacted with provides a command to the gaming application; and
- program instructions for projecting the visual actuator as the content onto the surface;
- program instructions for determining when the user actuates the visual actuator; and
- program instructions for sending the command to the gaming application for execution in the game play.

20. The transitory computer-readable medium of claim 15, wherein the program instructions for generating content further comprises:
- program instructions for determining a current context in the game play based on the information; and
- program instructions for generating contextually relevant information as the content based on the current context.

* * * * *